(12) United States Patent
Takahashi et al.

(10) Patent No.: US 9,185,372 B2
(45) Date of Patent: Nov. 10, 2015

(54) ILLUMINATION APPARATUS AND PROJECTION APPARATUS HAVING A LIGHT GUIDING UNIT WHICH GUIDES LIGHT TO A FLUORESCENT MATERIAL

(75) Inventors: Tatsuya Takahashi, Kanagawa (JP); Kazuhiro Fujita, Tokyo (JP)

(73) Assignee: RICOH COMPANY, LIMITED, Tokyo (JP)

( * ) Notice: Subject to any disclaimer, the term of this patent is extended or adjusted under 35 U.S.C. 154(b) by 424 days.

(21) Appl. No.: 13/531,954

(22) Filed: Jun. 25, 2012

(65) Prior Publication Data

US 2013/0010264 A1    Jan. 10, 2013

(30) Foreign Application Priority Data

Jul. 5, 2011    (JP) ................................. 2011-149522
Sep. 13, 2011   (JP) ................................. 2011-199927
Mar. 7, 2012    (JP) ................................. 2012-050999

(51) Int. Cl.
G03B 21/14    (2006.01)
H04N 9/31     (2006.01)
G03B 21/20    (2006.01)
G03B 33/08    (2006.01)

(52) U.S. Cl.
CPC ............ *H04N 9/3158* (2013.01); *G03B 21/204* (2013.01); *G03B 21/2013* (2013.01); *G03B 21/2073* (2013.01); *G03B 33/08* (2013.01); *H04N 9/3114* (2013.01)

(58) Field of Classification Search
USPC .............................. 353/20, 31, 85
See application file for complete search history.

(56) References Cited

U.S. PATENT DOCUMENTS

2009/0284148 A1* 11/2009 Iwanaga .................... 313/506
2010/0085541 A1    4/2010 Chen
2010/0328625 A1* 12/2010 Miyazaki et al. ............ 353/85
2010/0328626 A1* 12/2010 Miyazaki .................... 353/85

FOREIGN PATENT DOCUMENTS

| DE | 10 2007 037 875 A1 | 2/2009 |
|---|---|---|
| JP | 2010-97003 | 4/2010 |
| JP | 4662185 | 1/2011 |
| JP | 4829470 | 9/2011 |
| JP | 2012-42735 | 3/2012 |

OTHER PUBLICATIONS

Extended European Search Report issued Nov. 9, 2012 in Patent Application No. 12173894.2.

* cited by examiner

*Primary Examiner* — Georgia Epps
*Assistant Examiner* — Renee D Chavez
(74) *Attorney, Agent, or Firm* — Oblon, McClelland, Maier & Neustadt, L.L.P.

(57) ABSTRACT

An illumination apparatus emits light onto an optical modulation device for forming an image according to a modulation signal and illuminating an object. The illumination apparatus includes a light source; a fluorescent material that emits light of a color different from a color of light emitted by the light source; and a light guiding unit that switches between a state in which the light emitted from the light source is guided to the fluorescent material and a state in which the light emitted from the light source is not guided to the fluorescent material.

14 Claims, 26 Drawing Sheets

ILLUMINATION APPARATUS AND PROJECTION APPARATUS HAVING A LIGHT GUIDING UNIT WHICH GUIDES LIGHT TO A FLUORESCENT MATERIAL

CROSS-REFERENCE TO RELATED APPLICATIONS

The present application claims priority to and incorporates by reference the entire contents of Japanese Patent Application No. 2011-149522 filed in Japan on Jul. 5, 2011, Japanese Patent Application No. 2011-199927 filed in Japan on Sep. 13, 2011, and Japanese Patent Application No. 2012-050999 filed in Japan on Mar. 7, 2012.

BACKGROUND OF THE INVENTION

1. Field of the Invention

The present invention relates to an illumination apparatus and a projection apparatus for emitting multiple light beams of which colors are different from each other.

2. Description of the Related Art

Conventionally, at a site of a conference and the like, screen information of an information processing apparatus such as a personal computer (hereinafter abbreviated as PC) is projected onto a screen using a projector, so that information is shared by attendances at the site.

Conventionally, such projector mainly uses a high-intensity discharge lamp such as an ultrahigh pressure mercury lamp as a light source. Although the discharge lamp can achieve high luminance at a low cost, an alternative light source is required because, e.g., it takes time for the discharge lamp to emit light of a predetermined level after the discharge lamp is turned on, and because consideration is given to the environment.

Therefore, it has been proposed to use a solid-state light-emitting device such as light-emitting diodes (LEDs) of red (R), green (G), and blue (B) or an organic EL as an alternative light source in place of the discharge lamp in the projector, and such solid-state light-emitting device has been put into practice. When the solid-state light-emitting device is used as a light source of a projector, the projector can be started in a short time, and consideration can be given to the environment.

A technique to obtain lights in various colors using a blue color laser diode or a light-emitting diode emitting light of blue color, which is one of solid-state light-emitting device, has been put into practice. For example, when the blue color laser diode is used, a laser light that is output from the blue color laser diode is emitted onto a fluorescent material, so that the fluorescent material is excited, and a light in a color unique to the fluorescent material is emitted. Using these characteristics, lights of the respective colors, i.e., R, G, B, can be obtained, and a technique for using the lights obtained with the fluorescent material as a light source of the projector has been developed. Using an optical modulation device such as a DMD (Digital Micromirror Device), the lights of the respective colors, i.e., R, G, B, thus obtained are subjected to tone control for each pixel, whereby a color projection image is obtained.

For example, when the blue color laser diode is used as a light source of a projector, the amount of light is insufficient if only one laser diode is used per one color. Therefore, in general, a laser diode array, in which several to several dozen laser diodes are integrally formed as a light source, is used.

Japanese Patent Application Laid-open No. 2004-341105 discloses a projection-type display apparatus including a light-emitting diode, a fluorescent material layer converting, into a visible light, an ultraviolet light emitted by the light-emitting diode, and a transparent substrate.

According to Japanese Patent Application Laid-open No. 2004-341105, a disk is divided into three regions, and at an incident side, a visible light reflection film transmitting an ultraviolet light and reflecting a visible light is formed in each region. In each region at an emitting side opposite to the incident side with the transparent layer interposed therebetween, a fluorescent material layer for converting the wavelength of the ultraviolet light into the respective colors, i.e., R, G, B, is formed. By rotating the disk, the ultraviolet light emitted from the light source is converted into lights of wavelengths of R, G, B by each region of the fluorescent material layer, and the repeated color lights of R, G, B are emitted. The color lights are emitted onto a space optical modulator to be optically modulated, and are enlarged and projected onto a screen via a projection lens.

Furthermore, Japanese Patent Application Laid-open No. 2009-277516 discloses a light source apparatus and a projector, in which fluorescent material layers are arranged in multiple segment regions of a circular transparent substrate, and a visible light having lower level of energy than an ultraviolet light is emitted onto a fluorescent material as an excitation light, whereby lights of respective colors are obtained.

However, in the conventional techniques such as those explained in Japanese Patent Application Laid-open No. 2004-341105 and Japanese Patent Application Laid-open No. 2009-277516, the disk is divided into multiple regions by its radius, and the fluorescent material layers generating different colors in the respective divided regions are formed, so that each color is emitted in a time division manner by rotating the disk. Therefore, in the fluorescent material layer in each of the colors, the laser light is concentrated and emitted onto a limited size of area, and this makes the emitted portion into a so-called "burnt" state, which may deteriorate the characteristics of the fluorescent material layer.

In order to avoid deterioration of the characteristics of the fluorescent material layer caused by concentrated emission of the laser light onto a particular portion of each color, there is an idea to provide a disk having a fluorescent material layer for each color without dividing the disk into respective color regions. In this case, however, it is necessary to provide a light source for each color, and there is a problem in that the cost increases and the size of the apparatus increases.

Therefore, there is a need for an illumination apparatus and a projection apparatus capable of obtaining light of each color using less number of light sources in case where light of each color is obtained by exciting the fluorescent material.

SUMMARY OF THE INVENTION

According to an embodiment, there is provided an illumination apparatus for emitting light onto an optical modulation device that forms an image according to a modulation signal and illuminates an object. The illumination apparatus includes a light source; a fluorescent material that emits light of a color different from a color of light emitted by the light source; and a light guiding unit that switches between a state in which the light emitted from the light source is guided to the fluorescent material and a state in which the light emitted from the light source is not guided to the fluorescent material.

According to another embodiment, there is provided a projection apparatus that projects an image based on image data. The projection apparatus includes a first light source; a fluorescent material that emits light of a color different from a color of light emitted by the first light source; a light guiding unit that switches between a first state in which the light emitted from the first light source is guided to the fluorescent material and a second state in which the light emitted from the first light source is not guided to the fluorescent material; an optical modulation device onto which the light emitted from the light guiding unit is emitted, and which forms an image according to a modulation signal using the light; a projection optical system that projects the image formed by the optical modulation device onto a display medium; and a control unit configured to sequentially switch between the first state and the second state of the light guiding unit within one frame period of the image data.

According to still another embodiment, there is provided a projection apparatus that projects an image based on image data. The projection apparatus includes a first light source that emits light of a first color; a second light source that emits light of a second color; a fluorescent material that emits light of a third color by being excited by the light of the first color; a light guiding unit that switches between a first state in which the light emitted from the first light source is guided to the fluorescent material and a second state in which the light emitted from the first light source is not guided to the fluorescent material; an optical modulation device onto which the light emitted from the light guiding unit and the light emitted from the second light source are emitted, and which forms an image according to a modulation signal using each of the lights emitted; and a control unit configured to control the first light source, the second light source, and the light guiding unit so that, within one frame period of the image data, at least one of the light of the first color, the light of the second color, and the light of the third color is emitted onto the optical modulation device.

The above and other objects, features, advantages and technical and industrial significance of this invention will be better understood by reading the following detailed description of presently preferred embodiments of the invention, when considered in connection with the accompanying drawings.

DETAILED DESCRIPTION OF THE PREFERRED EMBODIMENTS

First Embodiment

Figure 1:
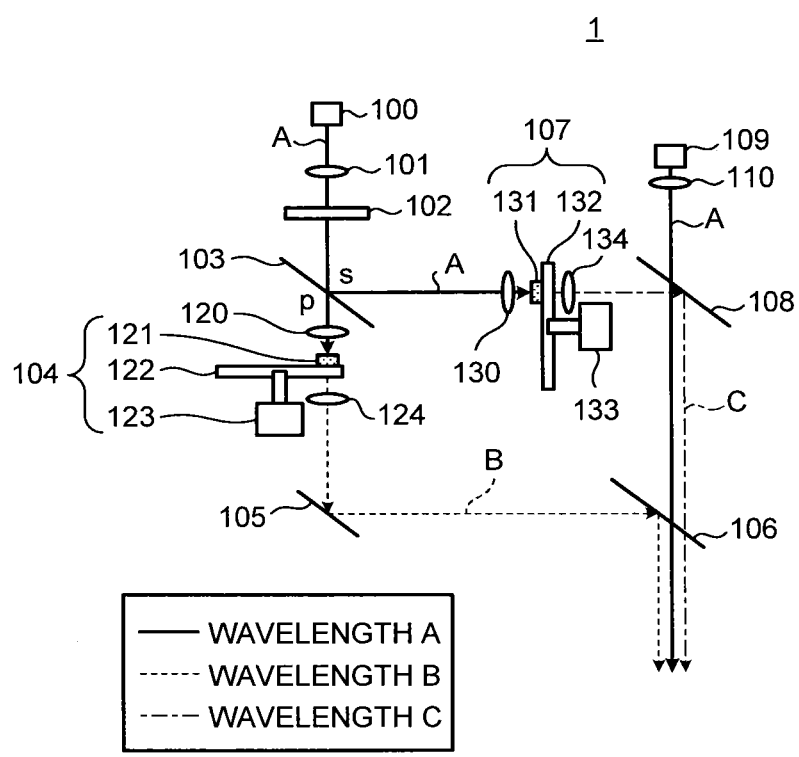
FIG. 1 is a schematic diagram illustrating an example of configuration of an illumination apparatus according to a first embodiment.

An embodiment of an illumination apparatus and a projection apparatus according to the present invention will be hereinafter explained in detail with reference to attached drawings. FIG. 1 illustrates an example of configuration of an illumination apparatus 1 according to a first embodiment of the present invention. The illumination apparatus 1 includes light sources 100 and 109, coupling lenses 101 and 110, a polarization conversion switch 102, a polarization beam splitter 103, fluorescent material wheel units 104 and 107, a mirror 105, and dichroic mirrors 106 and 108. The fluorescent material wheel unit 104 includes condensing devices 120 and 124, a fluorescent material 121, a substrate 122, and a drive unit 123. Likewise, the fluorescent material wheel unit 107 includes condensing devices 130 and 134, a fluorescent material 131, a substrate 132, and a drive unit 133.

Optical paths in the illumination apparatus 1 will be explained with reference to FIG. 1. First, the optical path with the light source 100 will be explained. The light source 100 is a light-emitting device emitting light of a short wavelength. For example, a blue color laser diode emitting blue color laser light may be used as the light source 100. Alternatively, the light source 100 may be a light-emitting diode emitting light of blue color. The light source 100 emits linearly polarized light ray of a wavelength A (for example, in a range of wavelength of 400 nm to 450 nm). In this case, it is assumed that the light source 100 emits p-polarized light ray. The light ray emitted from the light source 100 is made into a parallel light beam by the coupling lens 101, and is incident upon the polarization conversion switch 102.

Figure 2:
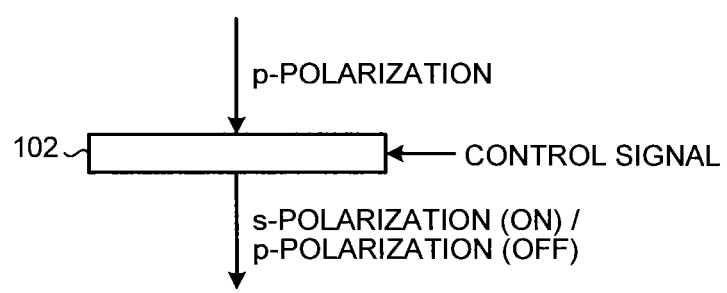
FIG. 2 is a schematic diagram for explaining polarization conversion switch.

The polarization conversion switch 102 converts the polarization of the incident light ray according to ON/OFF thereof. For example, as illustrated as an example in FIG. 2, when the polarization conversion switch 102 is ON while the p-polarized light ray passes through the polarization conversion switch 102, the p-polarized light ray is converted into s-polarized light and the converted light is output. On the other hand, when the polarization conversion switch 102 is OFF while the p-polarized light ray passes through the polarization conversion switch 102, the p-polarized light ray is output without being converted. Likewise, when the polarization of the incident light ray is s-polarization, the polarization conversion switch 102 acts as follows. When the polarization conversion switch 102 is ON, the s-polarized light ray is converted into p-polarized light and the converted light is output. When the polarization conversion switch 102 is OFF, it is converted into s-polarized light and the converted light is output. The polarization conversion switch 102 is turned ON/OFF according to the control signal provided from the outside. The polarization conversion switch 102 may be, for example, a liquid crystal polarization device for controlling polarization of light using the characteristics of liquid crystal.

An optical path selecting unit is structured by combining the polarization conversion switch 102 and the polarization beam splitter 103 for switching transmission and reflection of the light ray according to the direction of polarization. With this structure, the optical path selecting unit can select which of multiple light ray emission targets an optical path is guided to. In other words, the polarization conversion switch 102 controls the polarization direction of the light ray, so as to select one of the transmission direction and the reflection direction of the polarization beam splitter 103 the optical path is guided to.

Back to the explanation of FIG. 1, first, a case where the polarization conversion switch 102 is OFF will be explained. In this case, the light ray passes through the polarization conversion switch 102, and the light ray is incident upon the polarization beam splitter 103 while the polarization of the light ray is still the p-polarization. The polarization beam splitter 103 transmits the p-polarized light ray but reflects the s-polarized light ray. Therefore, the light ray passes through the polarization beam splitter 103, and is guided to and incident upon the fluorescent material wheel unit 104. The p-polarized light ray incident upon the fluorescent material wheel unit 104 is condensed by the condensing device 120, and illuminates the fluorescent material 121.

Figure 3:
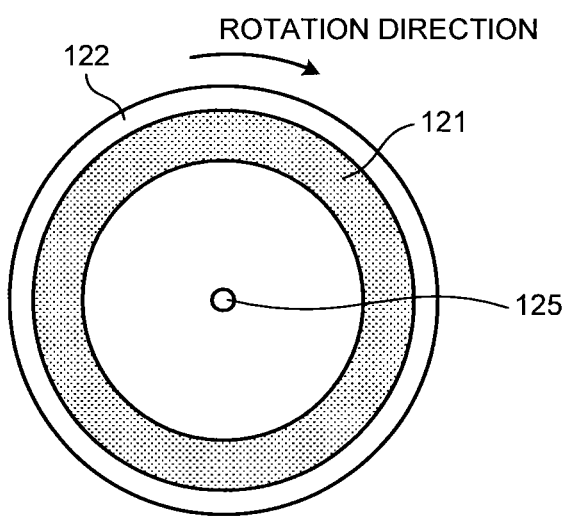
FIG. 3 is a schematic diagram illustrating a substrate of a fluorescent material wheel unit when it is seen from a surface on which a fluorescent material is formed.

FIG. 3 is a figure illustrating the substrate 122 of the fluorescent material wheel unit 104 when it is seen from a surface on which the fluorescent material 121 is formed. The fluorescent material 121 is formed in a ring shape on the disk-shaped substrate 122 made of a transparent member. The fluorescent material 121 is excited by the light of the wavelength A, and emits light of a wavelength B which is a longer wavelength than the wavelength A. The wavelength B is, for example, in a range of 620 nm to 750 nm which is red color. This light of the wavelength B emitted by being excited by the light of the wavelength A transmitted from the light source 100 passes through the substrate 122, and this light of the wavelength B is emitted from the fluorescent material wheel unit 104 via the condensing device 124.

The substrate 122 is rotated and driven by the drive unit 123 about a rotation center 125 at the center of the disk. In other words, the light ray emitted from the light source 100 is condensed by the condensing device 120, and is emitted onto the fluorescent material 121. At this occasion, the light ray is condensed to a small region, and is emitted onto the fluorescent material 121. Therefore, when this light ray is emitted onto the same portion of the fluorescent material 121 at all times, the fluorescent material 121 becomes so-called "burnt" state, which may deteriorate the characteristics of the fluorescent material 121 or damage the fluorescent material 121.

In this first embodiment, the substrate 122 is rotated and driven about the rotation center 125, and the position of the fluorescent material 121 to which the light ray is emitted is changed over time. Therefore, the energy of the light ray does not concentrate on a small region of the fluorescent material 121, and this can suppress deterioration of the characteristics of the fluorescent material 121.

It should be noted that the method for changing, over time, the position of the fluorescent material 121 to which the light ray is emitted is not limited to rotating and driving of the substrate 122. In other words, the substrate 122 may be moved so that the light ray is emitted onto the fluorescent material 121 in a continuous manner and the position to which the light ray is to be emitted returns back with a predetermined cycle. For example, it may be possible to vibrate and move the substrate 122 in a direction perpendicular to the incident direction of the light ray. It should be noted that the rotation speed is not particularly limited when the substrate 122 is rotated and driven.

Back to the explanation of FIG. 1, the light ray of the wavelength B emitted from the fluorescent material wheel unit 104 is reflected by the mirror 105 at a predetermined angle, and is incident upon the dichroic mirror 106. The dichroic mirror 106 is configured to reflect the light ray of the wavelength B and transmit light rays of other wavelengths. The light ray of the wavelength B incident upon the dichroic mirror 106 is reflected at a predetermined angle, and the light ray of the wavelength B is emitted from the illumination apparatus 1.

Next, a case where the polarization conversion switch 102 is ON will be explained. In this case, the polarization of the light ray is converted from the p-polarization to the s-polarization, and the light ray is emitted from the polarization conversion switch 102, and is incident upon the polarization beam splitter 103. This s-polarized light ray is reflected by the polarization beam splitter 103 at the predetermined angle, and is incident upon the fluorescent material wheel unit 107. In other words, when the polarization conversion switch 102 is ON, the s-polarized light ray is not guided to the fluorescent material wheel unit 104 but is guided to the fluorescent material wheel unit 107.

The fluorescent material wheel unit 107 has substantially the same configuration as the fluorescent material wheel unit 104 explained with reference to FIG. 3. The fluorescent material 131 is formed in a ring shape on the disk-shaped substrate 132 made of a transparent member. The fluorescent material wheel unit 107 is rotated and driven by the drive unit 133 about the rotation center at the central portion of the substrate 132. The fluorescent material 131 of the fluorescent material wheel unit 107 is excited by the light of the wavelength A, and emits light of a wavelength C which is a longer wavelength than the wavelength A. The wavelength C is, for example, in a range of 495 nm to 570 nm which is green color. This light of the wavelength C emitted by being excited by the light of the wavelength A transmitted from the light source 100 passes through the substrate 132, and this light of the wavelength C is emitted from the fluorescent material wheel unit 107 via the condensing device 134.

The light ray of the wavelength C emitted from the fluorescent material wheel unit 107 is incident upon the dichroic mirror 108. The dichroic mirror 108 is configured to reflect the light ray of the wavelength C and transmit light rays of other wavelengths. The light ray of the wavelength C incident upon the dichroic mirror 108 is reflected at a predetermined angle, and the light ray of the wavelength C passes through the dichroic mirror 106 and is emitted from the illumination apparatus 1.

Next, the optical path with the light source 109 will be explained. The light source 109 is a light-emitting device emitting light of a short wavelength. For example, a blue color laser diode emitting blue color laser light may be used as the light source 109. Alternatively, the light source 109 may be a light-emitting diode emitting light of blue color. Like the light source 100, the light source 109 emits the light ray of the wavelength A. It should be noted that, in the light source 109, the polarization direction of the emitted light ray is not particularly limited. The light ray of the wavelength A emitted from the light source 109 is made into a parallel light beam by the coupling lens 110, and the light ray of the wavelength A passes through each of the dichroic mirrors 108 and 106. Then, the light ray of the wavelength A is emitted from the illumination apparatus 1.

As described above, the combination of the polarization conversion switch 102 and the polarization beam splitter 103 switches between a state in which the light ray is guided to the fluorescent material 121 and a state in which the light ray is not guided to the fluorescent material 121. Alternatively, from the viewpoint of the fluorescent material 131, it can be said that the combination of the polarization conversion switch 102 and the polarization beam splitter 103 switches between a state in which the light ray is guided to the fluorescent material 131 and a state in which the light ray is not guided to the fluorescent material 131.

Example of Application of First Embodiment

Figure 4:
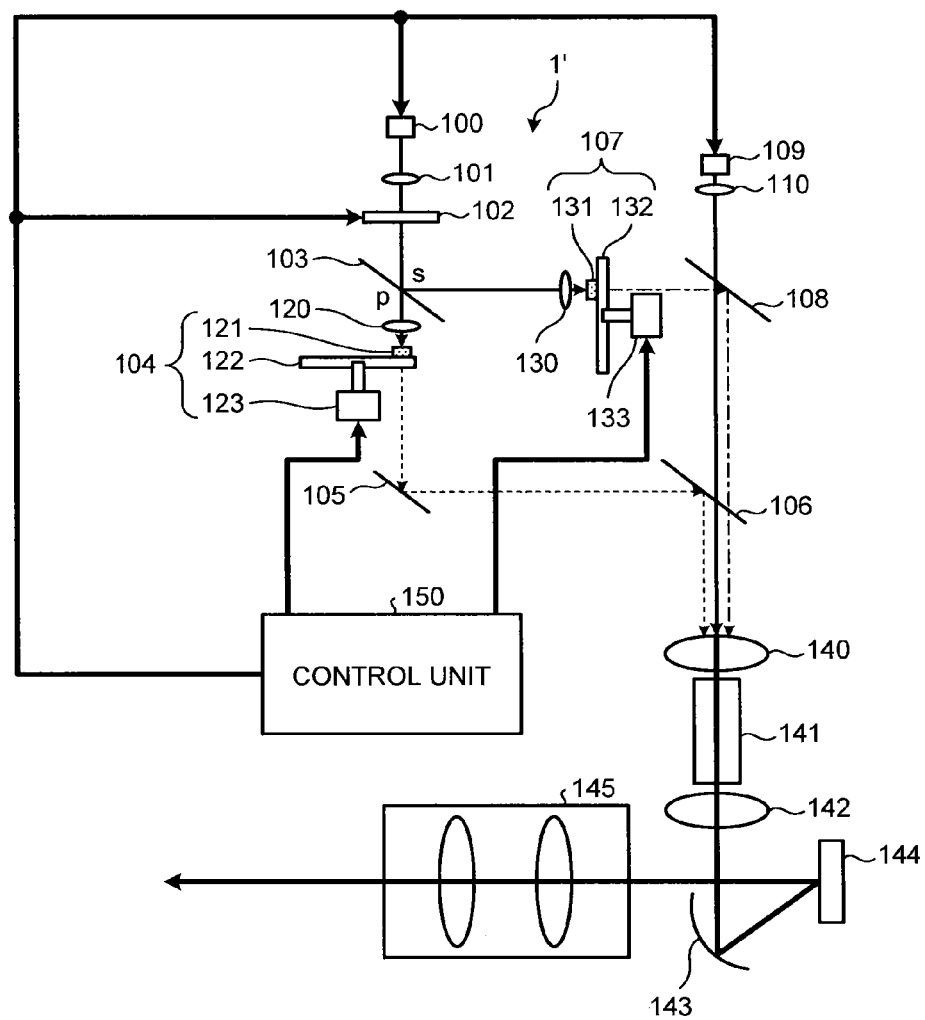
FIG. 4 is a block diagram illustrating an example of configuration of a projection apparatus using the illumination apparatus according to the first embodiment.

FIG. 4 illustrates an example of configuration of a projection apparatus 10 using the illumination apparatus 1 of FIG. 1. In FIG. 4, the same components as those of FIG. 1 are denoted with the same reference numerals, and detailed description thereabout is omitted. The projection apparatus 10 has an illumination apparatus 1' corresponding to the illumination apparatus 1 explained with reference to FIG. 1 and a control unit 150, and further includes a projection optical system including condensing devices 140 and 142, an integrator 141, a mirror 143, an image generating unit 144, and a projection lens 145.

In the illumination apparatus 1' assembled into the projection apparatus 10, the optical paths of the light rays of the wavelength A emitted from the light sources 100 and 109 are the same as the optical paths explained with reference to FIG. 1 except that the condensing devices 124 and 134 at the emitting sides of the fluorescent material wheel units 104 and 107 are omitted, and therefore, description thereabout is omitted.

In the projection apparatus 10, the light beams of the light rays of the wavelengths A, B, and C emitted from the dichroic mirror 106 are condensed by the condensing device 140, and the light beams are dispersed uniformly in a plane-like manner by the integrator 141. Then, the light beams are emitted onto the image generating unit 144 via the condensing device 142 and the mirror 143.

The image generating unit 144 is an optical modulation device for forming an image according to a modulation signal, and for example, a DMD (Digital Micromirror Device) can be used as the image generating unit 144. In this example, the image generating unit 144 reflects the emitted light by controlling tone of each display pixel, according to a drive signal (modulation signal) based on image data. When only one image generating unit 144 is used, light beams of R (red color), G (green color), and B (blue color) are switched and emitted in order of time within a frame period. In addition, the image generating unit 144 is driven by generating a drive signal based on image data of each of RGB in synchronization with timing of emission of each of RGB colors. Therefore, by making use of the afterimage phenomenon of eyes, a full color image according to the image data can be obtained.

The light beams of RGB colors, of which tones are controlled for each display pixel by the image generating unit 144, are emitted from the projection apparatus 10 via the projection lens 145, and are projected onto a display medium (not shown) such as a screen serving as an object to be illuminated, so that an enlarged image is displayed.

It should be noted that the control unit 150 includes a CPU (Central Processing Unit), ROM (Read Only Memory), and RAM (Random Access Memory), and controls operation of the entire projection apparatus 10 using the RAM as work memory in accordance with a program stored in the ROM in advance. In addition, the control unit 150 has an interface for an external information device (not shown), and, for example, the control unit 150 can retrieve image data which are output from a personal computer.

The control unit 150 performs image processing on the retrieved image data, and generates image data appropriate for driving the image generating unit 144. The generated image data are provided to, for example, a drive signal generating unit, not shown. The drive signal generating unit can generate a drive signal based on the provided image data, and drives the image generating unit 144. Further, the control unit 150 controls the light sources 100 and 109 and the polarization conversion switch 102 based on the retrieved image data. The control unit 150 can also perform rotation control of the drive units 123 and 133 of the fluorescent material wheel units 104 and 107.

Figure 5:
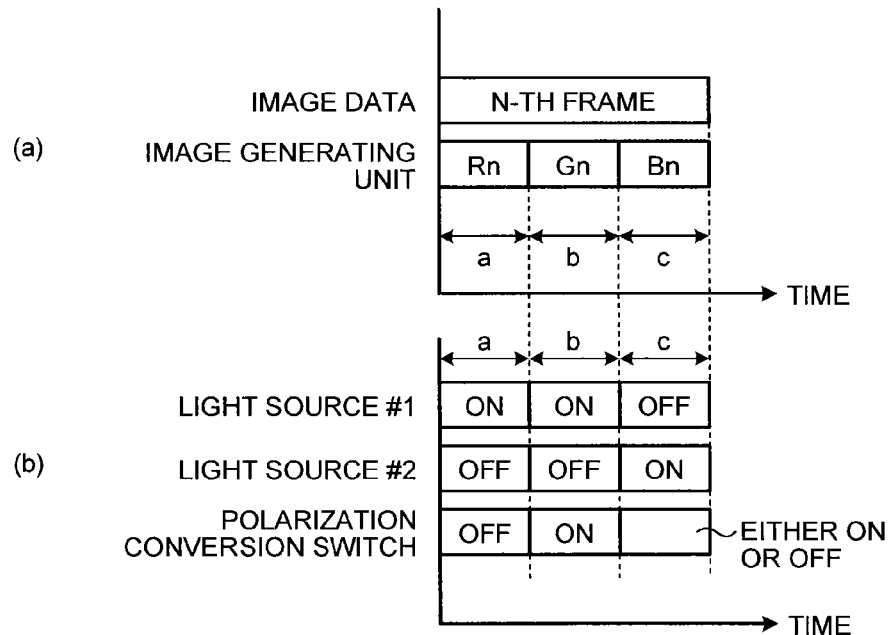
FIG. 5 is a schematic diagram illustrating an example of relationship between an image frame and control for obtaining emitted lights of RGB colors.

FIG. 5 illustrates an example of relationship between an image frame and control for obtaining emitted lights of RGB colors. As shown in the part (a) of FIG. 5, in the n-th frame of the image data, the light beams of RGB colors, i.e., Rn, Gn, and Bn, are generated, and these light beams Rn, Gn, and Bn are emitted onto the image generating unit 144. In FIG. 5, for the sake convenience, the light source 100 is denoted as a light source #1, and the light source 109 is denoted as a light source #2. The light source #1 (light source 100) emits a p-polarized light ray. When the polarization conversion switch 102 is ON, the polarization conversion switch 102 converts the p-polarization into the s-polarization and emits the s-polarized light. When the polarization conversion switch 102 is OFF, the polarization conversion switch 102 transmits the p-polarized light as it is.

As illustrated in the part (b) of FIG. 5, in a period a in which the light beam Rn is generated, the control unit 150 turns on the light source #1 (ON), and turns off the light source #2 (OFF). At the same time, the polarization conversion switch 102 is controlled to be turned off. In a period b in which the light beam Gn is generated, the control unit 150 turns on the light source #1 (ON), and turns off the light source #2 (OFF). At the same time, the polarization conversion switch 102 is controlled to be turned on. In a period c in which the light beam Bn is generated, the control unit 150 turns off the light source #1 (OFF), and turns on the light source #2 (ON). In this case, no light ray is emitted onto the polarization conversion switch 102, and therefore, the polarization conversion switch 102 may be either ON or OFF.

By performing the control as described above, the light beams of RGB colors, i.e., Rn, Gn, and Bn, are generated within one frame, and are emitted onto the image generating unit 144. Therefore, full color can be projected, and in addition, white color can be projected. In addition, the color can be changed by adjusting emission periods a, b, and c of RGB colors, respectively. For example, when the ratio of the period a is increased within one frame period, the level of red color can be increased in a projection image. For example, when the emission periods a, b, and c of RGB colors are appropriately adjusted, the color temperature can also be changed.

As described above, according to this first embodiment, the light rays of the wavelength B and the wavelength C are generated from the light ray of the wavelength A emitted from one light source 100. Therefore, it is not necessary to prepare a light source for each of RGB colors, and the cost of the projection apparatus 10 can be reduced. In addition, the size of the apparatus can be reduced.

Modification of First Embodiment

Next, a modification of the first embodiment will be explained. In the first embodiment explained above, only one of the light source 100 and the light source 109 is turned on. The configuration is not limited to this example. Both of the light sources 100 and 109 may be turned on at the same time.

Figure 6:
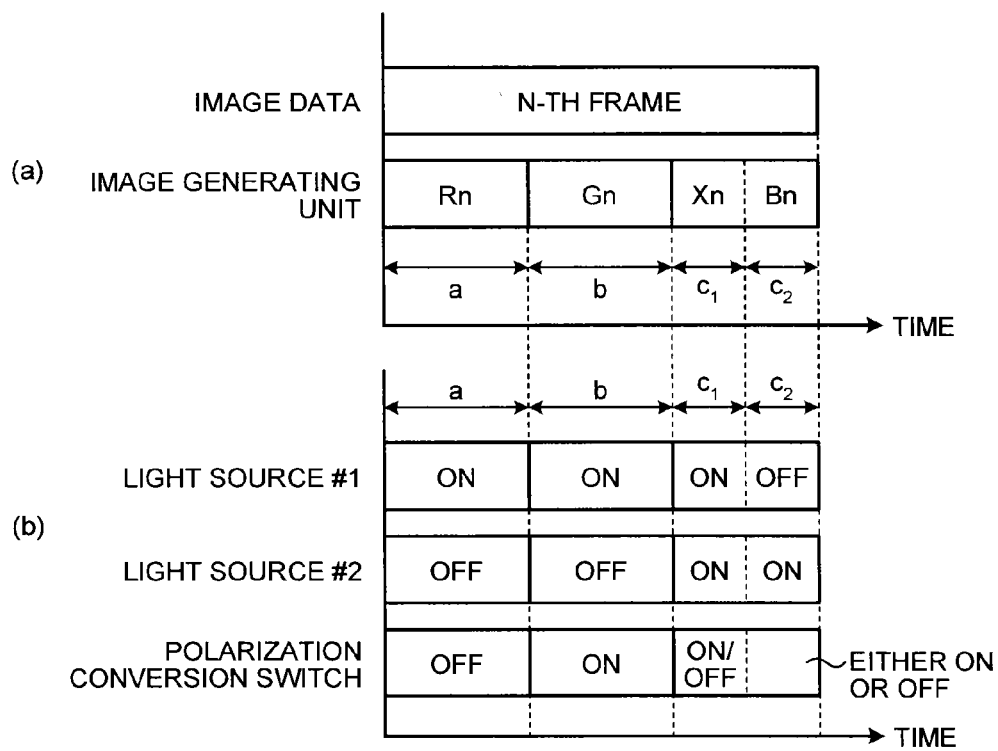
FIG. 6 is a schematic diagram illustrating an example of control according to a modification of the first embodiment.

FIG. 6 illustrates an example of control according to this modification of the first embodiment. As illustrated in the part (a) of FIG. 6, it is assumed that light beams of RGB colors, i.e., Rn, Gn, and Bn are generated in the n-th frame of image data. As illustrated in the part (b) of FIG. 6, a period in which the light source #2 (light source 109) is turned on is divided into two periods, i.e., a period $c_1$ and a period $c_2$. For example, in the period $c_1$, the light source #1 is also turned on at the same time.

At this occasion, by turning on the polarization conversion switch 102, the polarization of the light ray of the wavelength A emitted from the light source 100 is converted into the s-polarization by the polarization conversion switch 102, and the light ray is reflected by the polarization beam splitter 103 and is incident upon the fluorescent material wheel unit 107. In the fluorescent material wheel unit 107, the incident light ray of the wavelength A is emitted onto the fluorescent material 131, and is made into a light ray of a wavelength C (for example, green color). Then, the light ray is reflected by the dichroic mirror 108, passes through the dichroic mirror 106, and is emitted. At the same time, the light ray of the wavelength A emitted from the light source 109 passes through the dichroic mirrors 108 and 106 and is emitted. Therefore, the light ray of the wavelength C and the light ray of the wavelength A are emitted at the same time, and a color (cyan) obtained by mixing the blue color and the green color can be obtained, which allows obtaining a brighter projection image.

Likewise, when the polarization conversion switch 102 is turned off, the light ray of the wavelength B (red color) emitted from the fluorescent material wheel unit 104 is emitted simultaneously with the light ray of the wavelength A emitted from the light source 109. In this case, a color (magenta) obtained by mixing the red color and the blue color can be obtained.

Second Embodiment

Next, a second embodiment of the present invention will be explained. In the first embodiment explained above, in the fluorescent material wheel units 104 and 107, the substrate 122 in which the fluorescent material 121 is formed is made of a transparent member. In contrast, in this second embodiment, a substrate in which a fluorescent material is formed is made of a reflection member.

Figure 7:
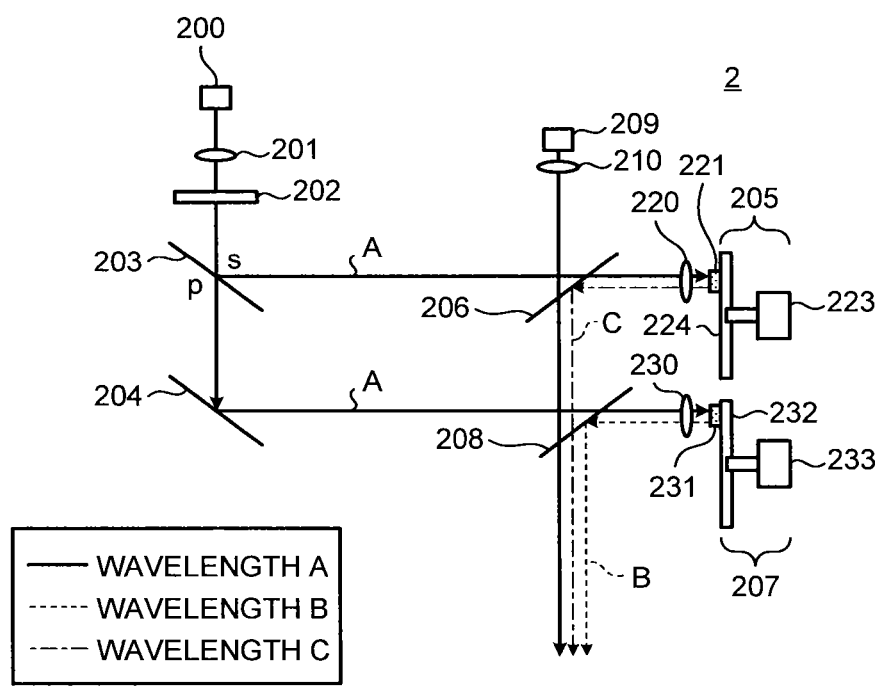
FIG. 7 is a schematic diagram illustrating an example of configuration of an illumination apparatus according to a second embodiment.

FIG. 7 illustrates an example of configuration of an illumination apparatus 2 according to this second embodiment. The illumination apparatus 2 includes light sources 200 and 209, coupling lenses 201 and 210, a polarization conversion switch 202, a polarization beam splitter 203, a mirror 204, fluorescent material wheel units 205 and 207, and dichroic mirrors 206 and 208. The fluorescent material wheel unit 205 unit includes a condensing device 220, a fluorescent material 221, a substrate 224, and a drive unit 223. Likewise, the fluorescent material wheel unit 207 includes a condensing device 230, a fluorescent material 231, a substrate 232, and a drive unit 233.

Optical paths in the illumination apparatus 2 will be explained. First, the optical path with the light source 200 will be explained. The light source 200 corresponds to the light source 100 explained above. For example, a blue color laser diode emitting blue color laser light may be used as the light source 200. The light source 200 emits p-polarized light ray of a wavelength A (for example, in a range of wavelength of 400 nm to 450 nm). The light ray emitted from the light source 200 is made into a parallel light beam by the coupling lens 201, and is incident upon the polarization conversion switch 202.

The polarization conversion switch 202 corresponds to the polarization conversion switch 102 explained above. The polarization conversion switch 202 converts the polarization of the incident light ray according to ON/OFF thereof. More specifically, when the polarization conversion switch 202 is ON, the polarization conversion switch 202 converts the polarization direction of the incident light into another polarization direction and emits the light, and when the polarization conversion switch 202 is OFF, the polarization conversion switch 202 emits the incident light as it is without changing the polarization direction.

First, a case where the polarization conversion switch 202 is OFF will be explained. In this case, the light ray passes through the polarization conversion switch 202 and the light ray is incident upon the polarization beam splitter 203 while the polarization of the light ray is still the p-polarization. The polarization beam splitter 203 transmits the p-polarized light ray but reflects the s-polarized light ray. Therefore, the light ray passes through the polarization beam splitter 203, and is reflected by the mirror 204 at a predetermined angle and is incident upon the fluorescent material wheel unit 207. The p-polarized light ray incident upon the fluorescent material wheel unit 207 is condensed by the condensing device 230, and illuminates the fluorescent material 231.

The fluorescent material wheel unit 207 has substantially the same configuration as the fluorescent material wheel unit 104 explained above. The fluorescent material 231 is formed in a ring shape on the disk-shaped substrate 232 made of a reflection member. The fluorescent material wheel unit 207 is rotated and driven by the drive unit 233 about the rotation center at the central portion of the substrate 232. However, the embodiment is not limited thereto. Like the first embodiment, the substrate 232 is rotated and driven at a predetermined rotation speed by the drive unit 233. However, the embodiment is not limited thereto. The substrate 232 may be vibrated and driven.

The fluorescent material 231 corresponds to the fluorescent material 121 explained above. The fluorescent material 231 is excited by the light of the wavelength A, and emits light of a wavelength B, which is, for example, in a range of 620 nm to 750 nm which is red color. The light of the wavelength B is reflected by the substrate made of a reflection member, and is incident upon the dichroic mirror 208 via the condensing device 230. As described above, in this second embodiment, the condensing device 230 is used by both of the light ray of the wavelength A emitted onto the fluorescent material 231 and the light ray of the wavelength B emitted from the fluorescent material 231.

The dichroic mirror 208 is configured to reflect the light ray of the wavelength B and transmit light rays of other wavelengths. The light ray of the wavelength B incident upon the dichroic mirror 208 is reflected at a predetermined angle, and the light ray of the wavelength B is emitted from the illumination apparatus 2.

Next, a case where the polarization conversion switch 202 is ON will be explained. In this case, the polarization of the light ray is converted from the p-polarization to the s-polarization, and the light ray is emitted from the polarization conversion switch 202, and is incident upon the polarization beam splitter 203. This s-polarized light ray is reflected by the polarization beam splitter 203 at the predetermined angle, and is incident upon the fluorescent material wheel unit 205.

The fluorescent material wheel unit 205 has substantially the same configuration as the fluorescent material wheel unit 207 explained above. The fluorescent material 221 is formed in a ring shape on the disk-shaped substrate 224 made of a reflection member. The fluorescent material wheel unit 205 is rotated and driven by the drive unit 223 about the rotation center at the central portion of the substrate 224. The fluorescent material 221 of the fluorescent material wheel unit 205 is excited by the light of the wavelength A, and emits light of a wavelength C, which is, for example, in a range of 495 nm to 570 nm which is green color. The light of the wavelength C, which is emitted by being excited by the light of the wavelength A emitted from the light source 200, is reflected by the substrate 224, and is incident upon the dichroic mirror 206 via the condensing device 220. As described above, in this second embodiment, the condensing device 220 is used by both of the light ray of the wavelength A emitted onto the fluorescent material 221 and the light ray of the wavelength C emitted from the fluorescent material 221.

The dichroic mirror 206 is configured to reflect the light ray of the wavelength C and transmit light rays of other wavelengths. The light ray of the wavelength C incident upon the dichroic mirror 206 is reflected at a predetermined angle, and the light ray of the wavelength C passes through the dichroic mirror 208 and is emitted from the illumination apparatus 2.

Next, the optical path with the light source 209 will be explained. The light source 209 corresponds to the light source 109 explained above. For example, a blue color laser diode emitting blue color laser light may be used as the light source 209, and the light ray of the wavelength A is emitted. It should be noted that, in the light source 209, the polarization direction of the emitted light ray is not particularly limited. The light ray of the wavelength A emitted from the light source 209 is made into a parallel light beam by the coupling lens 210, and the light ray of the wavelength A passes through each of the dichroic mirrors 206 and 208. Then, the light ray of the wavelength A is emitted from the illumination apparatus 2.

Like the illumination apparatus 1 according to the first embodiment, the illumination apparatus 2 according to this second embodiment can be incorporated into the projection apparatus 10, and the control thereof is the same. Therefore, detailed description thereabout is omitted here. The relationship between an image frame and control for obtaining emitted lights of RGB colors is the same as the control explained with reference to FIG. 5, and the modification of the first embodiment explained with reference to FIG. 6 can also be applied to this second embodiment in the same manner.

As described above, in this second embodiment, the substrates 224 and 232 used for the fluorescent material wheel units 205 and 207 are made of the reflection member. Therefore, for example, some of the optical path can be shared by the light ray emitted onto the fluorescent material 221 and the light ray emitted from the fluorescent material 221, and the space of the illumination apparatus 2 can be effectively used, which enables reducing the size of the illumination apparatus 2.

Modification of Second Embodiment

Next, a modification of the second embodiment will be explained. In the second embodiment explained above, the fluorescent materials 231 and 221 emitting lights of the wavelength B and the wavelength C using the light of the wavelength A are formed on different substrates, i.e., the substrates 232 and 224, respectively. In contrast, in this modification of the second embodiment, a first fluorescent material and a second fluorescent material respectively emitting lights of different wavelengths using light of one wavelength are formed on one substrate.

Figure 8:
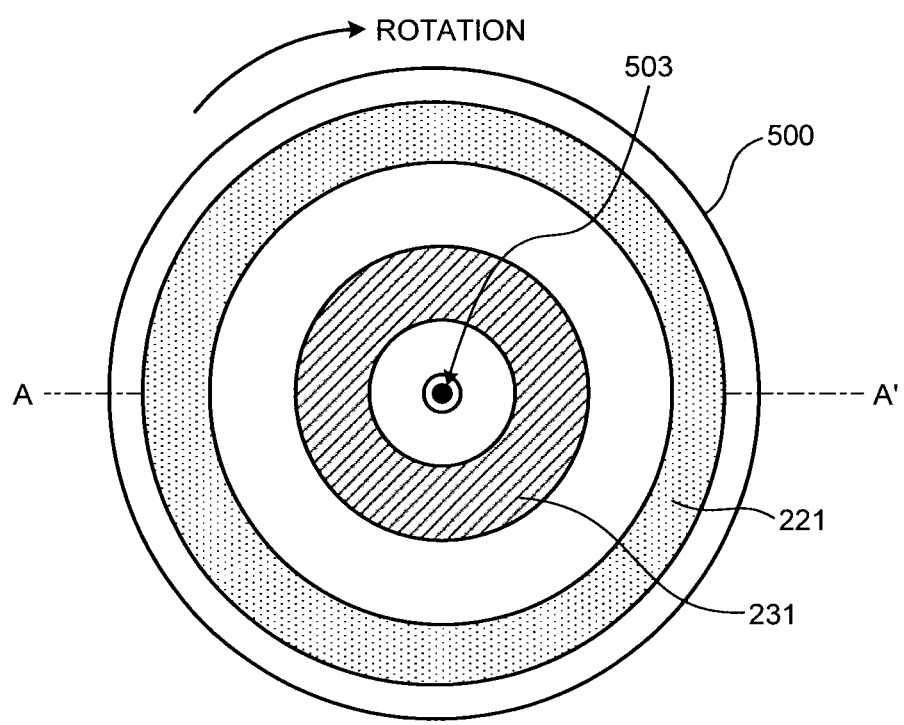
FIG. 8 is a schematic diagram illustrating an example of a substrate that can be applied to a modification of the second embodiment, when it is seen from a surface on which a fluorescent material is formed.

FIG. 8 is a figure illustrating an example of a substrate 500 that can be applied to this modification of the second embodiment, when it is seen from a surface on which the fluorescent materials 221 and 231 are formed. On the substrate 500 made of a reflection member, the fluorescent material 221 emitting light of the wavelength C by being excited by light of the wavelength A and the fluorescent material 231 emitting light of the wavelength B by being excited by light of the wavelength A are formed in a shape of belts having a predetermined width in a form of concentric circles. The center of the concentric circles is a rotation center 503, and the substrate 500 is rotated and driven about this rotation center 503.

In this example, each of the fluorescent materials 221 and 231 are formed in a shape of belt. However, the embodiment is not limited to this example. The disk-shaped substrate may be divided with a predetermined radius, and, for example, the fluorescent material 221 may be formed at the outside, and the fluorescent material 231 may be formed at the inside. The fluorescent material 221 emitting the light of the wavelength C, i.e., green color, is preferably arranged outside of a fluorescent material emitting other colors. This is because the green color is highly visible and requires the highest optical output, and the output of light of green color can be obtained more stably by forming the fluorescent material 221 at the outside portion where the circumference is longer and a larger size of area can be ensured.

Figure 9:
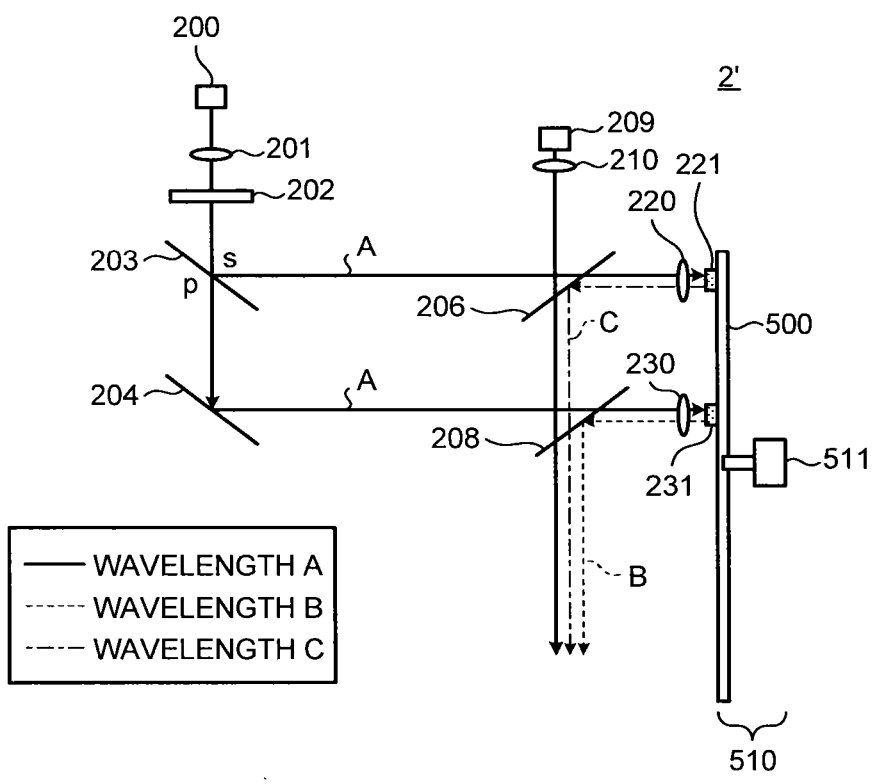
FIG. 9 is a schematic diagram illustrating an example of configuration of an illumination apparatus according to the modification of the second embodiment.

FIG. 9 illustrates an example of configuration of an illumination apparatus 2' according to this modification of the second embodiment. In FIG. 9, the same components as those of FIG. 7 explained above are denoted with the same reference numerals, and detailed description thereabout is omitted. A fluorescent material wheel unit 510 includes the substrate 500 on which the fluorescent materials 221 and 231 are formed, which was explained with reference to FIG. 8, and a drive unit 511 rotating and driving the substrate 500 about the rotation center 503. The substrate 500 is arranged so that the light from the condensing device 220 is emitted onto the fluorescent material 221 and the light from the condensing device 230 is emitted onto the fluorescent material 231.

With the configuration as described above, the light of the wavelength A reflected by the polarization beam splitter 203 is emitted onto the fluorescent material 221 formed on the substrate 500 via the dichroic mirror 206 and the condensing device 220. In the fluorescent material 221, the light of the wavelength C is emitted by being excited by the light ray of the wavelength A. This light of the wavelength C is reflected by the substrate 500 is incident upon and reflected by the dichroic mirror 206 via the condensing device 220, and the reflected light is emitted from the illumination apparatus 2'.

Likewise, the light of the wavelength A reflected by the mirror 204 is emitted onto the fluorescent material 231 formed on the substrate 500 via the dichroic mirror 208 and the condensing device 230. In the fluorescent material 231, the light of the wavelength B is emitted by being excited by the light ray of the wavelength A. This light of the wavelength B is reflected by the substrate 500 is incident upon and reflected by the dichroic mirror 208 via the condensing device 230, and the reflected light is emitted from the illumination apparatus 2'.

Like the illumination apparatus 1 according to the first embodiment, the illumination apparatus 2' according to this modification of the second embodiment can be incorporated into the projection apparatus 10, and the control thereof is the same. Therefore, detailed description thereabout is omitted here. The relationship between an image frame and control for obtaining emitted lights of RGB colors is the same as the control explained with reference to FIG. 5, and the modification of the first embodiment explained with reference to FIG. 6 can also be applied to this modification of the second embodiment in the same manner.

According to this modification of the second embodiment, it is sufficient to have only one substrate on which the fluorescent materials are formed and only one drive unit for driving the substrate. Therefore, as compared with the second embodiment explained above, the cost and the power consumption can be further reduced.

Third Embodiment

Next, a third embodiment of the present invention will be explained. In the second embodiment explained above, the substrates 224 and 232 on which the fluorescent materials 221 and 231 are formed are made of the reflection member, and the light rays of the wavelength A are emitted from two light sources, i.e., the light sources 200 and 209. In contrast, in this third embodiment, only one light source is used to obtain light beams of RGB colors.

Figure 10:
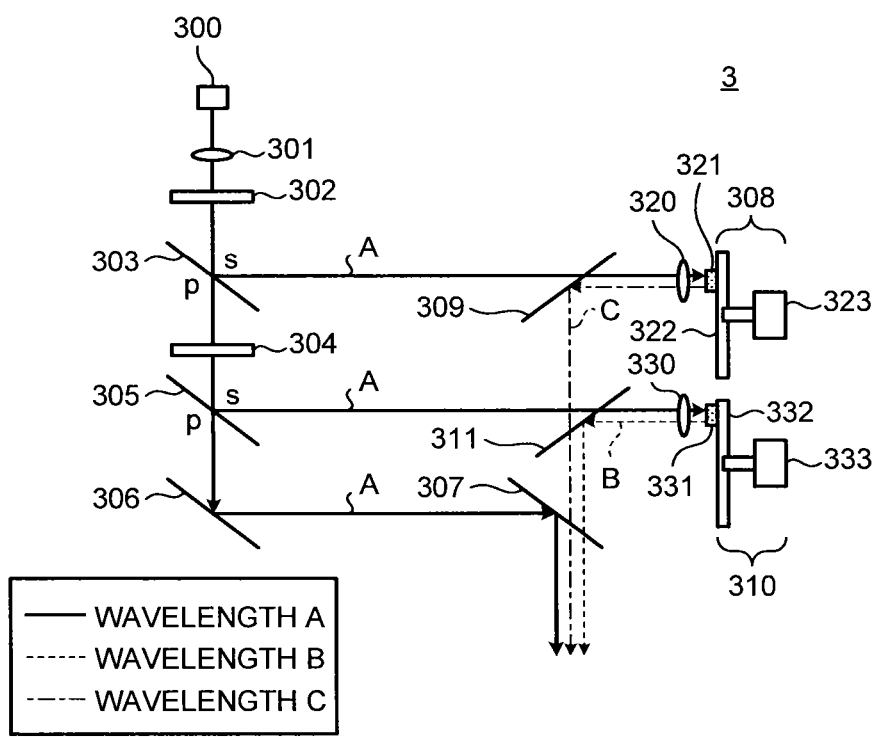
FIG. 10 is a schematic diagram illustrating an example of configuration of an illumination apparatus according to a third embodiment.

FIG. 10 illustrates an example of configuration of an illumination apparatus 3 according to this third embodiment of the present invention. The illumination apparatus 3 includes a light source 300, a coupling lens 301, polarization conversion switches 302 and 304, polarization beam splitters 303 and 305, a mirror 306, dichroic mirrors 307, 309, and 311, and fluorescent material wheel units 308 and 310. The fluorescent material wheel unit 308 includes a condensing device 320, a fluorescent material 321, a substrate 322, and a drive unit 323. Likewise, the fluorescent material wheel unit 310 includes a condensing device 330, a fluorescent material 331, a substrate 332, and a drive unit 333.

In FIG. 10, the polarization conversion switches 302 and 304 correspond to the polarization conversion switch 102 explained above. The polarization conversion switches 302 and 304 convert the polarization of the incident light ray according to ON/OFF thereof. More specifically, when the polarization conversion switches 302 and 304 are ON, the polarization conversion switches 302 and 304 convert the polarization direction of the incident light into another polarization direction and emit the light, and when the polarization conversion switches 302 and 304 are OFF, the polarization conversion switches 302 and 304 emit the incident light as it is without changing the polarization direction. In FIG. 10, each of the polarization beam splitters 303 and 305 transmit p-polarized light ray, and reflects s-polarized light ray.

Optical paths in the illumination apparatus 3 will be explained. The light source 300 corresponds to the light source 100 explained above. For example, a blue color laser diode emitting blue color laser light may be used as the light source 300, and the light source 300 emits p-polarized light ray of the wavelength A (for example, in a range of wavelength of 400 nm to 450 nm). The light ray of the wavelength A emitted from the light source 300 is made into a parallel light beam by the coupling lens 301, and is incident upon the polarization conversion switch 302.

First, a case where the polarization conversion switch 302 is OFF will be explained. In this case, the light ray passes through the polarization conversion switch 202, and the light ray is incident upon the polarization beam splitter 303 while the polarization of the light ray is still the p-polarization. The polarization beam splitter 303 transmits the p-polarized light ray but reflects the s-polarized light ray. Therefore, the light ray passes through the polarization beam splitter 303, and is incident upon the polarization conversion switch 304.

In this case, when the polarization conversion switch 304 is OFF, the light ray passes through the polarization conversion switch 302, and the light ray is incident upon the polarization beam splitter 305 while the polarization of the light ray is still the p-polarization. Then, the light ray passes through the polarization beam splitter 305, and is reflected by the mirror 306 at a predetermined angle and is incident upon the dichroic mirror 307 configured to reflect the light ray of the wavelength A and transmit light rays of other wavelengths. Since the light ray incident upon the dichroic mirror 307 is the light ray of the wavelength A, the light ray is reflected by the dichroic mirror 307 at a predetermined angle, and the light ray is emitted from the illumination apparatus 3.

On the other hand, when the polarization conversion switch 304 is ON, the polarization of the light ray is converted from the p-polarization to the s-polarization, and the light ray is emitted from the polarization conversion switch 304, and is incident upon the polarization beam splitter 305. This light ray is reflected by the polarization beam splitter 305 at a predetermined angle and is incident upon the dichroic mirror 311 configured to reflect the light ray of the wavelength B and transmit light rays of other wavelengths. Since the light ray incident upon the dichroic mirror 311 is the light ray of the wavelength A, the light ray passes through the dichroic mirror 311 and is incident onto the fluorescent material wheel unit 310. Then, the light ray is emitted onto the fluorescent material 331 via the condensing device 330.

As described above, the combination of the polarization conversion switch 304 and the polarization beam splitter 305 switches between a state in which the light ray is guided to the fluorescent material 331 and a state in which the light ray is not guided to the fluorescent material 331.

The fluorescent material wheel unit 310 has substantially the same configuration as the fluorescent material wheel unit 207 explained above. The fluorescent material 331 is formed in a ring shape on the disk-shaped substrate 332 made of a reflection member. The fluorescent material wheel unit 310 is rotated and driven by the drive unit 333 about the rotation center at the central portion of the substrate 332. The fluorescent material 331 corresponds to the fluorescent material 121 explained above. The fluorescent material 331 is excited by the light of the wavelength A, and emits light of a wavelength B, which is, for example, in a range of 620 nm to 750 nm which is red color. The light of the wavelength B is reflected by the substrate 332 made of the reflection member, and is incident upon the dichroic mirror 311 via the condensing device 330. Then, the light of the wavelength B is reflected by the dichroic mirror 311 at a predetermined angle, and further passes through the dichroic mirror 307. Then, the light of the wavelength B is emitted from the illumination apparatus 3.

When the polarization conversion switch 302 explained above is ON, the polarization of the light ray is converted from the p-polarization to the s-polarization, and the light ray is emitted from the polarization conversion switch 302, and is incident upon the polarization beam splitter 303. This light ray is reflected by the polarization beam splitter 303 at a predetermined angle and is incident upon the dichroic mirror 309 configured to reflect the light ray of the wavelength C and transmit light rays of other wavelengths. Since the light ray incident upon the dichroic mirror 309 is the light ray of the wavelength A, the light ray passes through the dichroic mirror 309 and is incident onto the fluorescent material wheel unit 308. Then, the light ray is emitted onto the fluorescent material 321 via the condensing device 320.

As described above, the combination of the polarization conversion switch 302 and the polarization beam splitter 303 switches between a state in which the light ray is guided to the fluorescent material 321 and a state in which the light ray is not guided to the fluorescent material 321.

The fluorescent material wheel unit 308 has substantially the same configuration as the fluorescent material wheel unit 310 explained above. The fluorescent material 321 is formed in a ring shape on the disk-shaped substrate 322 made of a reflection member. The fluorescent material wheel unit 308 is rotated and driven by the drive unit 323 about the rotation center at the central portion of the substrate 322. The fluorescent material 321 of the fluorescent material wheel unit 308 is excited by the light of the wavelength A, and emits light of a wavelength C, which is, for example, in a range of 495 nm to 570 nm which is green color. The light of the wavelength C, which is emitted by being excited by the light of the wavelength A emitted from the light source 300, is reflected by the substrate 322, and is incident upon the dichroic mirror 309 via the condensing device 320. Then, the light of the wavelength C is reflected by the dichroic mirror 309 at a predetermined angle, and further passes through the dichroic mirrors 311 and 307. Then, the light of the wavelength C is emitted from the illumination apparatus 3.

Figure 11:
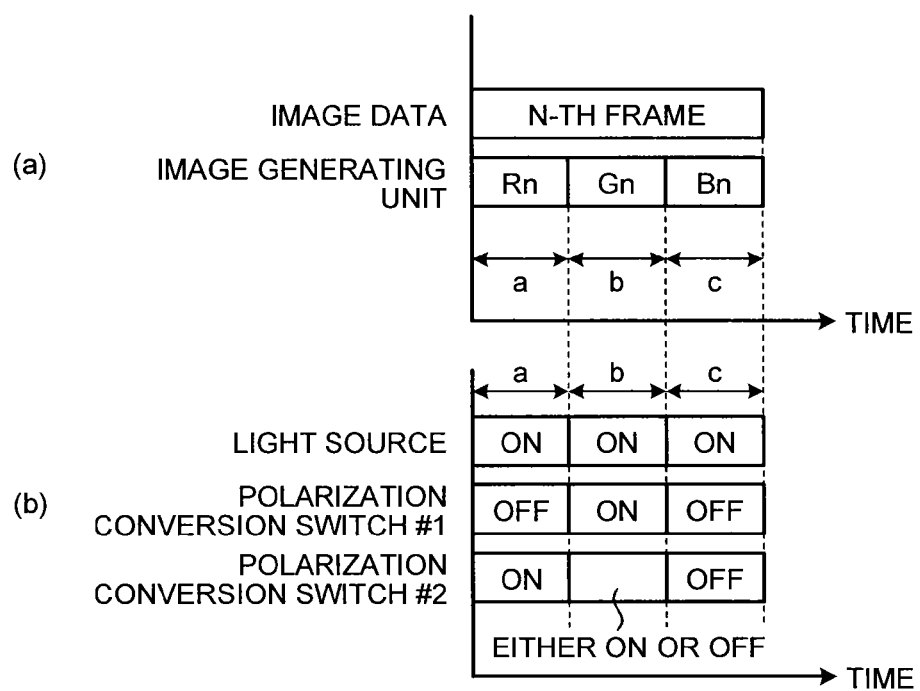
FIG. 11 is a schematic diagram illustrating an example of relationship between an image frame and control for obtaining emitted lights of RGB colors, according to the third embodiment.

FIG. 11 illustrates an example of relationship between an image frame and control for obtaining emitted lights of RGB colors, in the illumination apparatus 3 according to this third embodiment. As illustrated in the part (a) of FIG. 11, in the n-th frame of the image data, the light beams of RGB colors, i.e., Rn, Gn, and Bn, are generated, and these light beams Rn, Gn, and Bn are emitted onto the image generating unit 144.

In FIG. 11, for the sake convenience, the light source 300 is simply denoted as a light source, and the polarization conversion switches 302 and 304 are denoted as a polarization conversion switch #1 and a polarization conversion switch #2, respectively. The light source (light source 300) emits a p-polarized light ray. When the polarization conversion switches 302 and 304 are ON, the polarization conversion switches 302 and 304 convert the p-polarization into the s-polarization and emit the light, and when the polarization conversion switches 302 and 304 are OFF, the polarization conversion switches 302 and 304 allows the light to pass through them with its polarization still being the p-polarization.

As illustrated in the part (b) of FIG. 11, the light source is turned on (ON) in all of generation periods a, b, and c of the light beams Rn, Gn, and Bn. On the other hand, the polarization conversion switches #1 and #2 are controlled such that, in the period a in which the light beam Rn is generated, the polarization conversion switches #1 and #2 are turned off and on, respectively. In the period b in which the light beam Gn is generated, the polarization conversion switch #1 is controlled to be turned on, and the polarization conversion switch #2 is may be set in any state. In the period c in which the light beam Bn is generated, both of the polarization conversion switches #1 and #2 are turned off.

By performing the control as described above, the light beams of RGB colors, i.e., Rn, Gn, and Bn, are generated within one frame, and are emitted onto the image generating unit 144. Therefore, full color can be projected, and in addition, white color can be projected. In addition, the color can be changed by adjusting emission periods a, b, and c of RGB colors, respectively. For example, when the ratio of the period a is increased within one frame period, the level of red color can be increased in a projection image. For example, when the emission periods a, b, and c of RGB colors are appropriately adjusted, the color temperature can also be changed.

Like the illumination apparatus 1 according to the first embodiment, the illumination apparatus 3 according to this third embodiment can be incorporated into the projection apparatus 10, and the control thereof is the same. Therefore, detailed description thereabout is omitted here.

As described above, in this third embodiment, the substrates 322 and 332 used for the fluorescent material wheel units 308 and 310 are made of the reflection member. Therefore, for example, some of the optical path can be shared by the light ray emitted onto the fluorescent material 321 and the light ray emitted from the fluorescent material 321, and the space of the illumination apparatus 3 can be effectively used, which enables reducing the size of the illumination apparatus 3. In addition, the RGB colors are obtained using only one light source 300, and therefore, the size of the illumination apparatus 3 can be further reduced, and the cost and the power consumption can also be reduced.

Modification of Third Embodiment

Next, a modification of the third embodiment will be explained. Like the modification of the second embodiment explained above, this modification of the third embodiment is based on the third embodiment, and is further configured such that a first fluorescent material and a second fluorescent material respectively emitting lights of different wavelengths using light of one wavelength are formed on one substrate.

A substrate on which the first fluorescent material and the second fluorescent material are formed, which can be applied to this modification of the third embodiment, has the same configuration as the substrate 500 explained with reference to FIG. 8. More specifically, on the substrate 500 made of a reflection member, the fluorescent material 321 emitting light of the wavelength C by being excited by light of the wavelength A and the fluorescent material 331 emitting light of the wavelength B by being excited by light of the wavelength A are formed in a shape of belts having a predetermined width in a form of concentric circles. In this case, the fluorescent material 321 is assumed to be formed outside of the fluorescent material 331.

Figure 12:
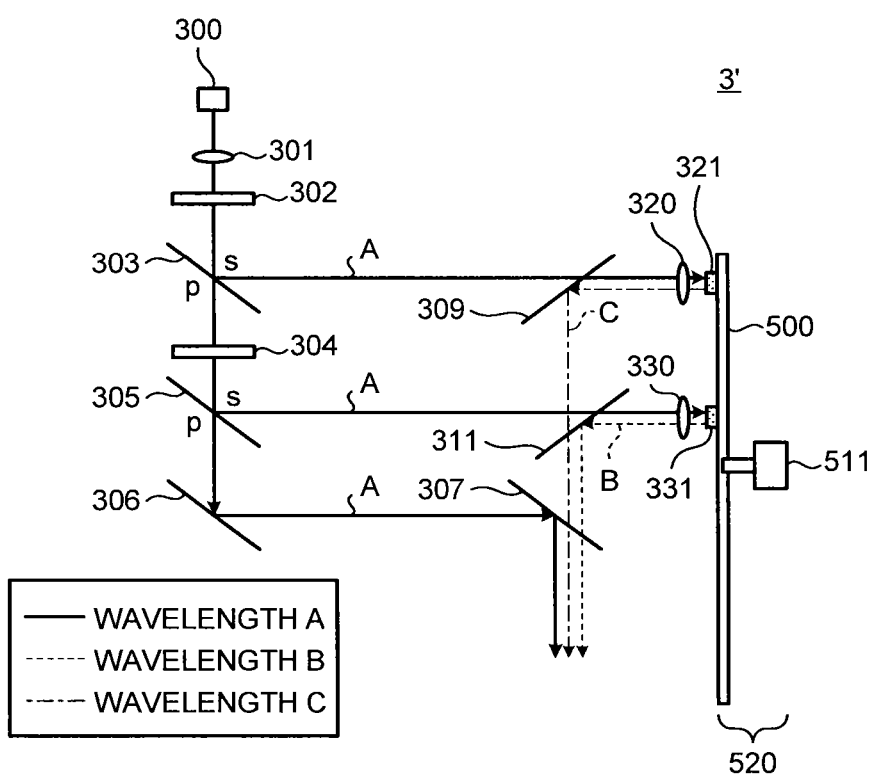
FIG. 12 is a schematic diagram illustrating an example of configuration of an illumination apparatus according to a modification of the third embodiment.

FIG. 12 illustrates an example of configuration of an illumination apparatus 3' according to this modification of the third embodiment. In FIG. 12, the same components as those of FIG. 10 explained above are denoted with the same reference numerals, and detailed description thereabout is omitted. A fluorescent material wheel unit 520 includes the substrate 500 on which the fluorescent materials 321 and 331 are formed, which was explained with reference to FIG. 8, and a drive unit 511 rotating and driving the substrate 500 about the rotation center 503. The substrate 500 is arranged so that the light from the condensing device 320 is emitted onto the fluorescent material 321 and the light from the condensing device 330 is emitted onto the fluorescent material 331.

With the configuration as described above, the light of the wavelength A reflected by the polarization beam splitter 303 is emitted onto the fluorescent material 321 formed on the substrate 500 via the dichroic mirror 309 and the condensing device 320. In the fluorescent material 321, the light of the wavelength C is emitted by being excited by the light ray of the wavelength A. This light of the wavelength C is reflected by the substrate 500 and is incident upon and reflected by the dichroic mirror 309 via the condensing device 320, and further the reflected light passes through the dichroic mirrors 311 and 307 and is emitted from the illumination apparatus 3'.

Likewise, the light of the wavelength A reflected by the polarization beam splitter 305 is emitted onto the fluorescent material 331 formed on the substrate 500 via the dichroic mirror 311 and the condensing device 330. In the fluorescent material 331, the light of the wavelength B is emitted by being excited by the light ray of the wavelength A. This light of the wavelength B is reflected by the substrate 500 and is incident upon and reflected by the dichroic mirror 311 via the condensing device 330, and further the reflected light passes through the dichroic mirror 307 and is emitted from the illumination apparatus 3'.

Like the illumination apparatus 1 according to the first embodiment, the illumination apparatus 3' according to this modification of the third embodiment can be incorporated into the projection apparatus 10, and the control thereof is the same. Therefore, detailed description thereabout is omitted here. The relationship between an image frame and control for obtaining emitted lights of RGB colors is the same as the control explained with reference to FIG. 11, and therefore, detailed description thereabout is omitted here.

According to this modification of the third embodiment, it is sufficient to have only one substrate on which the fluorescent materials are formed and only one drive unit for driving the substrate. Therefore, in addition to the third embodiment explained above, the cost and the power consumption can be further reduced.

Fourth Embodiment

Figure 13:
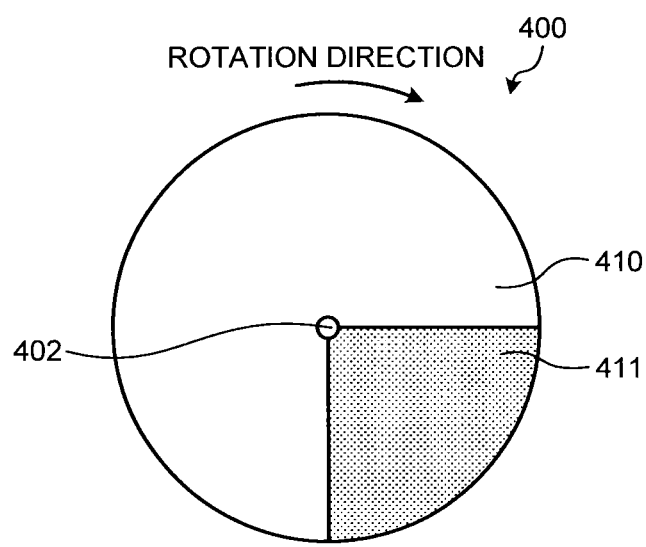
FIG. 13 is a schematic diagram illustrating an example of a reflection/transmission wheel according to a fourth embodiment.

Next, a fourth embodiment of the present invention will be explained. In the first embodiment explained above, the polarization conversion switch 102 and the polarization beam splitter 103 are used as the optical path selecting unit. In contrast, in this fourth embodiment, as illustrated in FIG. 13, a reflection/transmission wheel 400 is used. The reflection/transmission wheel 400 rotates about a rotation axis 402 and is a member in which one of regions divided by its radius is a transmission region 410 which transmits light and the other of the regions is a reflection region 411 which reflects light. This reflection/transmission wheel 400 is arranged on an optical path of light ray at a predetermined angle, and the reflection/transmission wheel 400 is rotated in synchronization with image data of respective colors, so that the optical path of light ray can be selected for each color.

In FIG. 13, in the reflection/transmission wheel 400, the reflection region 411 is formed in a range of angle of about 45 degrees with respect to the rotation axis 402, but this is not limited to this example.

Figure 14:
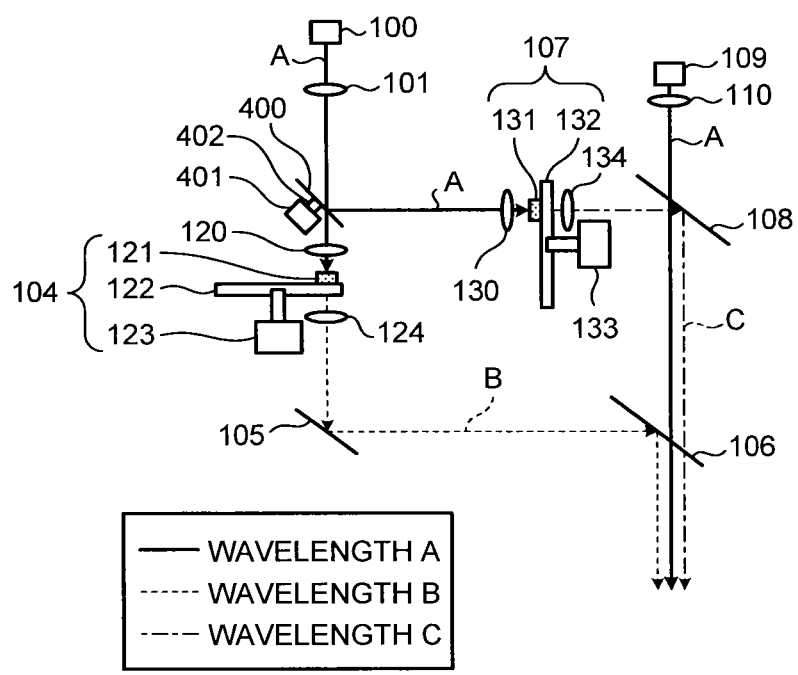
FIG. 14 is a schematic diagram illustrating an example of configuration of an illumination apparatus according to the fourth embodiment.

FIG. 14 illustrates an example of configuration of an illumination apparatus 4 according to this fourth embodiment. In FIG. 14, the same components as those of FIG. 1 explained above are denoted with the same reference numerals, and detailed description thereabout is omitted. As described above, the illumination apparatus 4 is provided with the reflection/transmission wheel 400, instead of the polarization conversion switch 102 and the polarization beam splitter 103 of the illumination apparatus 1 illustrated in FIG. 1.

The reflection/transmission wheel 400 is rotated by a drive unit 401 about the rotation axis 402. The reflection/transmission wheel 400 is provided in the optical path of the light ray of the wavelength A emitted from the light source 100, and when the transmission region 410 is in the optical path, the transmission region 410 transmits the light ray, and when the reflection region 411 is in the optical path, the reflection region 411 reflects the light ray according to a reflection angle corresponding to an angle of the reflection/transmission wheel 400.

First, in a case where the transmission region 410 exists in the optical path of the light ray of the wavelength A emitted from the light source 100, the optical path of the light ray will be explained. In this case, the light ray is incident upon the reflection/transmission wheel 400 via the coupling lens 101. The incident light ray passes through the transmission region 410 of the reflection/transmission wheel 400, and is incident upon the fluorescent material wheel unit 104.

The light of the wavelength A incident upon the fluorescent material wheel unit 104 is condensed by the condensing device 120, and is emitted on the fluorescent material 121 rotated by the drive unit 123. As explained with reference to FIG. 3, the fluorescent material 121 is formed in a ring shape on the disk-shaped substrate 122 made of a transparent member, and emits light of a wavelength B which is a longer wavelength than the wavelength A. This light of the wavelength B passes through the substrate 122, and this light of the wavelength B is emitted from the fluorescent material wheel unit 104 via the condensing device 124. The light of the wavelength B emitted from the fluorescent material wheel unit 104 is reflected by the mirror 105 and the dichroic mirror 106 at a predetermined angle, and the light of the wavelength B is emitted from the illumination apparatus 4.

Next, in a case where the reflection region 411 exists in the optical path of the light ray of the wavelength A emitted from the light source 100, the optical path of this configuration will be explained. The light ray of the wavelength A emitted from the light source 100 is incident upon the reflection/transmission wheel 400 via the coupling lens 101. The incident light ray is reflected by the reflection region 411 of the reflection/transmission wheel 400, and is incident upon a fluorescent material wheel unit 107 having substantially the same configuration as the fluorescent material wheel unit 104.

The light ray of the wavelength A incident upon the fluorescent material wheel unit 107 is emitted on the fluorescent material 131 via the condensing device 130. The fluorescent material 131 is excited by the light of the wavelength A, and emits light of a wavelength C which is a longer wavelength than the wavelength A. This light of the wavelength C passes through the substrate 132, and is emitted from the fluorescent material wheel unit 107 via the condensing device 134. The light of the wavelength C emitted from the fluorescent material wheel unit 107 is reflected by the dichroic mirror 108 at a predetermined angle, and further the light of the wavelength C is emitted from this illumination apparatus 4 via the dichroic mirror 106.

The light ray of the wavelength A emitted from the light source 109 passes through the dichroic mirrors 108 and 106, and is emitted from this illumination apparatus 4.

As described above, the reflection/transmission wheel 400 switches between a state in which the light ray is guided to the fluorescent material 121 and a state in which the light ray is not guided to the fluorescent material 121. Alternatively, from the viewpoint of the fluorescent material 131, it can be said that the combination of the polarization conversion switch 102 and the polarization beam splitter 103 switches between a state in which the light ray is guided to the fluorescent material 131 and a state in which the light ray is not guided to the fluorescent material 131. Therefore, using the reflection/transmission wheel 400, the optical direction of the light ray of the wavelength A emitted from the light source 100 is selected from two directions, and it is possible to obtain the light of the wavelength B and the light of the wavelength C.

In this case, with reference to FIG. 13, the transmission region 410 may be made as an opening portion in the reflection/transmission wheel 400. Accordingly, it is not necessary to prepare a member for forming the transmission region, and the cost of the apparatus can be reduced. It is to be understood that the reflection/transmission wheel 400 may be made by forming the reflection region 411 on a transparent member.

If a laser light source such as a laser diode is used as the light source 100, it may be possible to make the transmission region 410 of the reflection/transmission wheel 400 using a diffusion plate. In this case, there is an advantage in that, when the laser light emitted from the light source 100 passes through the transmission region 410, speckle caused by the laser light can be suppressed.

In the example of FIG. 14, the reflection/transmission wheel 400 is illustrated as being arranged at the angle of 45 degrees with respect to the propagation direction of the light ray emitted from the light source 100, but this is not limited to this example. That is, the reflection/transmission wheel 400 may be arranged at any angle as long as the optical path of the light ray emitted from the light source 100 can be switched between the fluorescent material wheel units 104 and 107 by rotating the reflection/transmission wheel 400. Therefore, the flexibility of layout of the illumination apparatus 4 can be improved.

In the above explanation, the transmission region 410 and the reflection region 411 are switched when the reflection/transmission wheel 400 rotates. But the embodiment is not limited to this example. For example, the transmission region 410 and the reflection region 411 may be switched by linear motion such as vibration motion.

Example of Application of Fourth Embodiment

Figure 15:
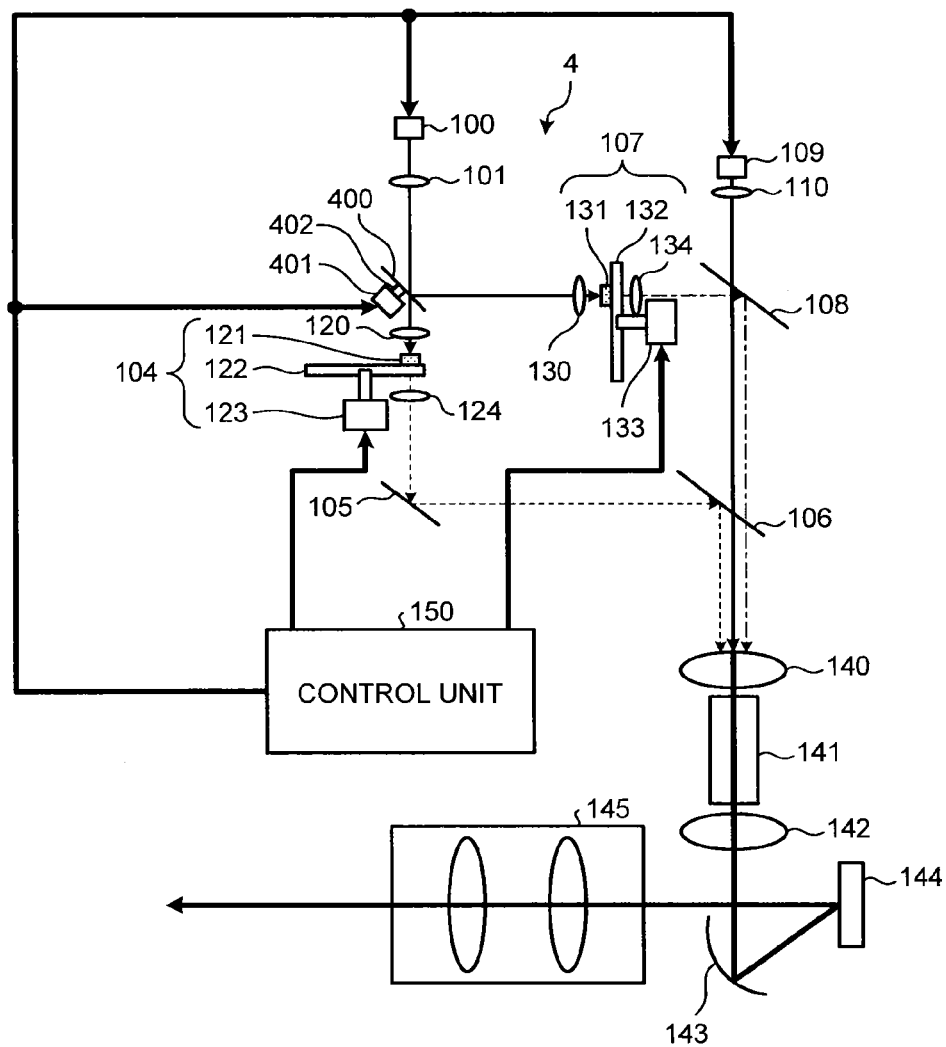
FIG. 15 is a block diagram illustrating an example of configuration of a projection apparatus using the illumination apparatus according to the fourth embodiment.

FIG. 15 illustrates an example of configuration of a projection apparatus 20 using the illumination apparatus 4 of FIG. 14. In FIG. 15, the same components as those of FIGS. 4 and 14 explained above are denoted with the same reference numerals, and detailed description thereabout is omitted. In the illumination apparatus 4 incorporated into the projection apparatus 20, the optical path of the light ray of the wavelength A emitted from the light sources 100 and 109 is the same as the optical path explained with reference to FIG. 14. On the other hand, the optical paths of the light beams of the light rays of the wavelengths A, B, and C emitted from the illumination apparatus 4 are the same as the optical paths explained with reference to FIG. 4. Therefore, description about these optical paths is omitted.

As illustrated in FIG. 15, for example, the drive unit 401 rotating the reflection/transmission wheel 400 is driven and controlled by the control unit 150. In other words, the control unit 150 drives and controls the image generating unit 144 based on image data retrieved from a personal computer and the like, and controls the light sources 100 and 109 and the drive unit 401.

Figure 16A:
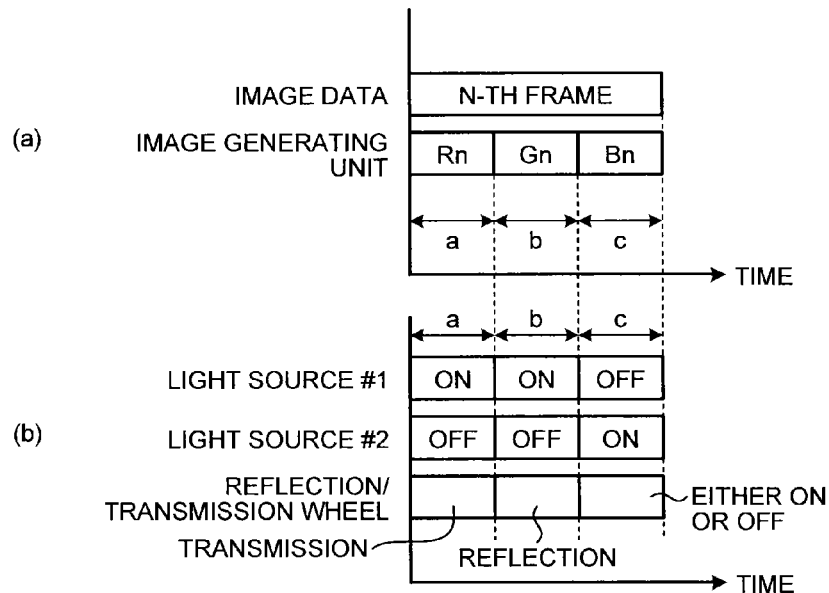
FIG. 16A is a schematic diagram illustrating an example of relationship between an image frame and control for obtaining emitted lights of RGB colors.

FIG. 16A illustrates an example of relationship between an image frame and control for obtaining emitted lights of RGB colors. FIG. 16A corresponds to FIG. 5 explained above. As illustrated in the part (a) of FIG. 16A, in the n-th frame of the image data, the light beams of RGB colors, i.e., Rn, Gn, and Bn, are generated, and these light beams Rn, Gn, and Bn are emitted onto the image generating unit 144.

As illustrated in the part (b) of FIG. 16A, in a period a in which the light beam Rn is generated, the control unit 150 turns on the light source #1 (ON), and turns off the light source #2 (OFF). In addition, the control unit 150 drives and controls the drive unit 401 so that the transmission region 410 of the reflection/transmission wheel 400 resides in the optical path of the light ray of the wavelength A transmitted from the light source #1 (light source 100). In a period b in which the light beam Gn is generated, the control unit 150 turns on the light source #1 (ON), and turns off the light source #2 (OFF). In addition, the control unit 150 drives and controls the drive unit 401 so that the reflection region 411 of the reflection/transmission wheel 400 resides in the optical path of the light ray of the wavelength A transmitted from the light source #1. Further, in a period c in which the light beam Bn is generated, the control unit 150 turns off the light source #1 (OFF), and turns on the light source #2 (ON). In this case, the light ray is not emitted onto the reflection/transmission wheel 400, and therefore, any one of the transmission region 410 and the reflection region 411 may reside in the optical path of the light ray of the wavelength A transmitted from the light source #1.

By performing the control as described above, the light beams of RGB colors, i.e., Rn, Gn, and Bn, are generated within one frame, and are emitted onto the image generating unit 144. Therefore, full color can be projected, and in addition, white color can be projected. In addition, the color can be changed by adjusting emission periods a, b, and c of RGB colors, respectively. For example, when the ratio of the period a is increased within one frame period, the level of red color can be increased in a projection image. For example, when the emission periods a, b, and c of RGB colors are appropriately adjusted, the color temperature can also be changed.

Figure 16B:
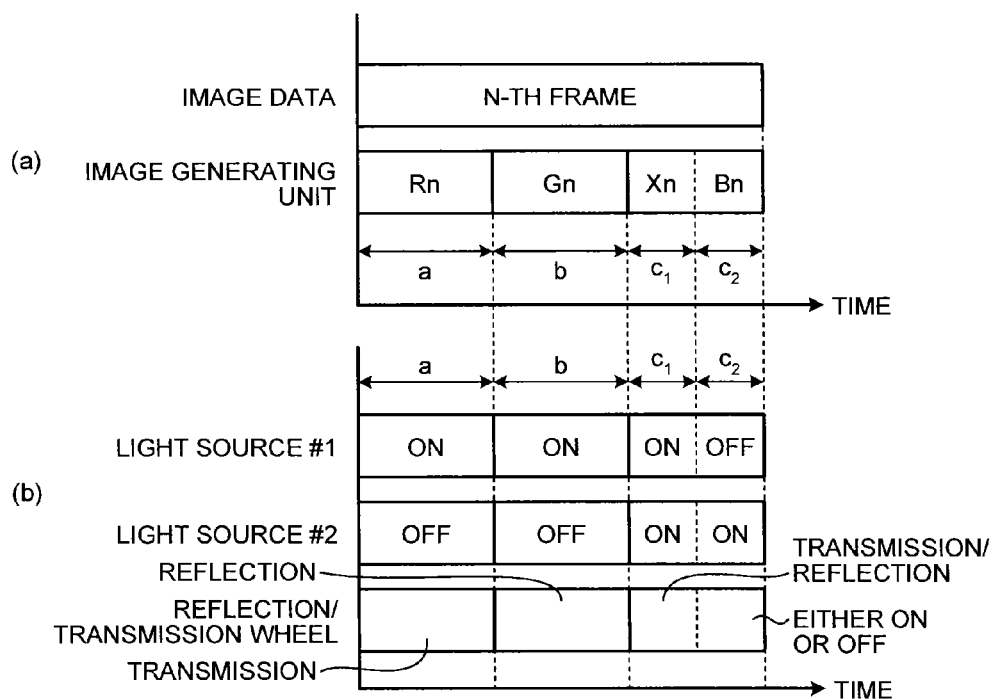
FIG. 16B is a schematic diagram illustrating an example of relationship between an image frame and control for obtaining emitted lights of RGB colors, when two light sources are turned on at a time.

The example of turning on the light sources 100 and 109 at the same time explained in the modification of the first embodiment explained above can also be applied to this fourth embodiment. More specifically, as illustrated in FIG. 16B as an example, the period in which the light source #2 (light source 109) is turned on is divided into two periods, i.e., a period $c_1$ and a period $c_2$. For example, in the period $c_1$, the light source #1 is also turned on at the same time.

At this occasion, the drive unit 401 is driven so that the transmission region 410 resides in the optical path of the light ray of the wavelength A transmitted from the light source #1. The light ray of the wavelength A is incident upon the fluorescent material wheel unit 104, and the fluorescent material 121 emits light of the wavelength B. This light of the wavelength B is reflected by the mirror 105, and is further reflected by the dichroic mirror 106. At the same time, the light ray of the wavelength A from the light source #2 is emitted via the dichroic mirrors 108 and 106. Therefore, the light ray of the wavelength B and the light ray of the wavelength A are emitted at the same time, and a color (magenta) in which red color and blue color are mixed can be obtained, and it is possible to obtain a brighter projection image.

Likewise, when the drive unit 401 is driven so that the reflection region 411 resides in the optical path of the light ray of the wavelength A transmitted from the light source #1, the light ray of the wavelength A reflected by the reflection/transmission wheel 400 is incident upon the fluorescent material wheel unit 107, and the fluorescent material 131 emits light of the wavelength C. This light ray of the wavelength C as well as the light ray of the wavelength A from the light source #2 are emitted from the dichroic mirror 106. Therefore, the light ray of the wavelength C and the light ray of the wavelength A are emitted at the same time, and a color (cyan) in which blue color and green color are mixed can be obtained, and it is possible to obtain a brighter projection image.

Fifth Embodiment

Figure 17:
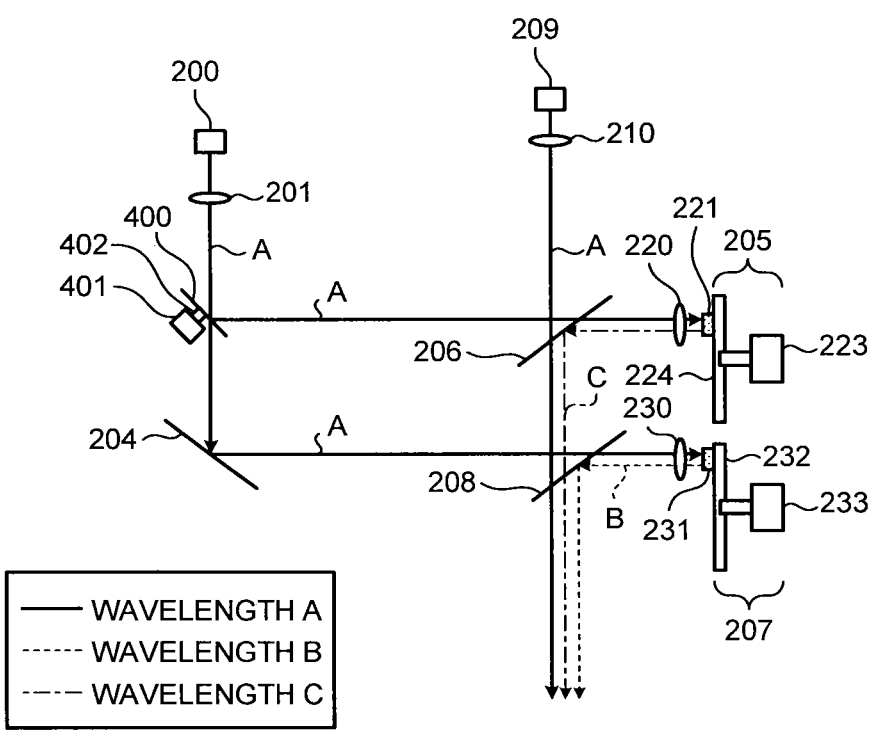
FIG. 17 is a schematic diagram illustrating an example of configuration of an illumination apparatus according to a fifth embodiment.

Subsequently, a fifth embodiment will be explained. FIG. 17 illustrates an example of configuration of an illumination apparatus 5 according to this fifth embodiment. In FIG. 17, the same components as those of FIG. 7 explained above are denoted with the same reference numerals, and detailed description thereabout is omitted.

This fifth embodiment corresponds to the second embodiment explained above. The illumination apparatus 5 includes fluorescent material wheel units 205 and 207 of which substrates on which fluorescent materials are formed are reflection members, and the polarization conversion switch 202 and the polarization beam splitter 203 of the illumination apparatus 2 according to the second embodiment illustrated in FIG. 7 are replaced with the reflection/transmission wheel 400.

Optical paths in the illumination apparatus 5 will be explained. When the transmission region 410 of the reflection/transmission wheel 400 exists in the optical path of the light ray of the wavelength A, which is, for example, blue color, emitted from the light source 200, the light ray passes through the reflection/transmission wheel 400, and is emitted onto the mirror 204. Then, the light ray is reflected by the mirror 204 at a predetermined angle, and passes through the dichroic mirror 208 configured to reflect the light ray of the wavelength B and transmit light rays of other wavelengths. Then, the light ray is incident upon the fluorescent material wheel unit 207.

The light ray of the wavelength A incident upon the fluorescent material wheel unit 207 is emitted onto the fluorescent material 231 via the condensing device 230. The fluorescent material 231 is excited by the light of the wavelength A, and emits light of a wavelength B (for example, red color) which is a longer wavelength than the wavelength A. This light of the wavelength B is reflected by the substrate 232 and is emitted on the dichroic mirror 208 via the condensing device 230. Then, the light of the wavelength B is reflected at a predetermined angle, and is emitted from the illumination apparatus 5.

On the other hand, when the reflection region 411 of the reflection/transmission wheel 400 exists in the optical path of the light ray of the wavelength A emitted from the light source 200, the light ray is reflected by the reflection/transmission wheel 400 at a predetermined angle, and passes through a dichroic mirror 206 configured to reflect the light ray of the wavelength C and transmit light rays of other wavelengths. Then, the light ray is incident upon the fluorescent material wheel unit 205.

The light ray of the wavelength A emitted from the fluorescent material wheel unit 205 is incident upon the fluorescent material 221 via the condensing device 220. The fluorescent material 221 is excited by the light of the wavelength A, and emits light of a wavelength C (for example, green color) which is a longer wavelength than the wavelength A. This light of the wavelength C is reflected by the substrate 224 and is emitted on the dichroic mirror 206 via the condensing device 220. Then, the light of the wavelength C is reflected at a predetermined angle, and further passes through the dichroic mirror 208. Then, the light of the wavelength C is emitted from the illumination apparatus 5.

The light ray of the wavelength A emitted from the light source 209 passes through the coupling lens 210 and the dichroic mirrors 208 and 206, and the light ray of the wavelength A is emitted from this illumination apparatus 5.

As described above, the reflection/transmission wheel 400 switches between a state in which the light ray is guided to the fluorescent material 221 and a state in which the light ray is not guided to the fluorescent material 221. Alternatively, from the viewpoint of the fluorescent material 231, it can be said that the combination of the reflection/transmission wheel 400 switches between a state in which the light ray is guided to the fluorescent material 231 and a state in which the light ray is not guided to the fluorescent material 231.

Like the illumination apparatus 4 according to the fourth embodiment, the illumination apparatus 5 according to this fifth embodiment can be incorporated into the projection apparatus 20, and the control thereof is the same. Therefore, detailed description thereabout is omitted here. The relationship between an image frame and control for obtaining emitted lights of RGB colors can also be applied like the control explained with reference to FIGS. 16A and 16B.

As described above, in this fifth embodiment, the substrates 224 and 232 used in fluorescent material wheel units 205 and 207 are made of a reflection member. Therefore, some of the optical path can be shared by, for example, the light ray emitted onto the fluorescent material 221 and the light ray emitted from the fluorescent material 221, and the space of the illumination apparatus 5 can be effectively used, which enables reducing the size of the illumination apparatus 5.

Modification of Fifth Embodiment

Next, a modification of the fifth embodiment will be explained. Like the modification of the second embodiment explained above, this modification of the fifth embodiment is based on the fifth embodiment, and is further configured such that a first fluorescent material and a second fluorescent material respectively emitting lights of different wavelengths using light of one wavelength are formed on one substrate.

Figure 18:
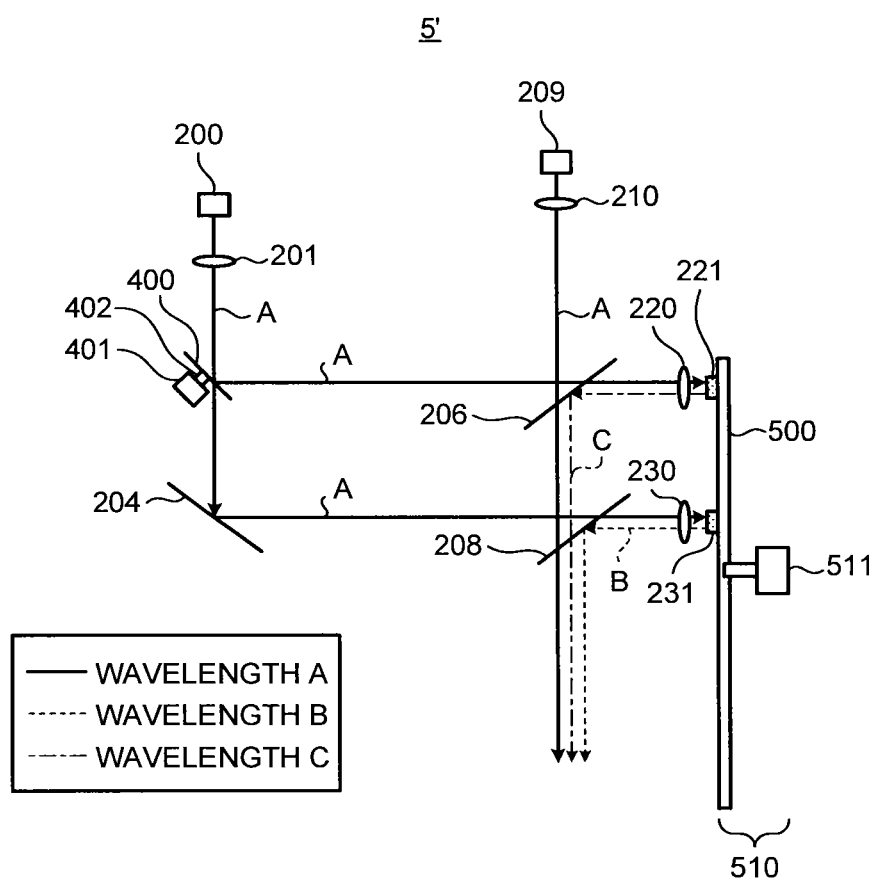
FIG. 18 is a schematic diagram illustrating an example of configuration of an illumination apparatus according to a modification of the fifth embodiment.

FIG. 18 illustrates an example of configuration of an illumination apparatus 5' according to this modification of the fifth embodiment. In FIG. 18, the same components as those of FIG. 17 explained above are denoted with the same reference numerals, and detailed description thereabout is omitted. The fluorescent material wheel unit 510 includes the substrate 500 on which the fluorescent materials 221 and 231 are formed, which was explained with reference to FIG. 8, and a drive unit 511 rotating and driving the substrate 500 about the rotation center 503. The substrate 500 is arranged so that the light from the condensing device 220 is emitted onto the fluorescent material 221 and the light from the condensing device 230 is emitted onto the fluorescent material 231.

With the configuration as described above, the light of the wavelength A reflected by the reflection/transmission wheel 400 is emitted onto the fluorescent material 221 formed on the substrate 500 via the dichroic mirror 206 and the condensing device 220. In the fluorescent material 221, the light of the wavelength C is emitted by being excited by the light ray of the wavelength A. This light of the wavelength C is reflected by the substrate 500 and is incident upon and reflected by the dichroic mirror 206 via the condensing device 220, and further the reflected light passes through the dichroic mirror 208 and is emitted from the illumination apparatus 5'.

Likewise, the light of the wavelength A reflected by the mirror 204 is emitted onto the fluorescent material 231 formed on the substrate 500 via the dichroic mirror 208 and the condensing device 230. In the fluorescent material 231, the light of the wavelength B is emitted by being excited by the light ray of the wavelength A. This light of the wavelength B is reflected by the substrate 500 and is incident upon and reflected by the dichroic mirror 208 via the condensing device 230, and is emitted from the illumination apparatus 5'.

Like the illumination apparatus 4 according to the fourth embodiment, the illumination apparatus 5' according to this modification of the fifth embodiment can be incorporated into the projection apparatus 20, and the control thereof is the same. Therefore, detailed description thereabout is omitted here. The relationship between an image frame and control for obtaining emitted lights of RGB colors can also be applied like the control explained with reference to FIGS. 16A and 16B.

As described above, in this modification of the fifth embodiment, it is sufficient to have only one substrate on which the fluorescent materials are formed and only one drive unit for driving the substrate. Therefore, as compared with the fifth embodiment explained above, the cost and the power consumption can be further reduced.

Sixth Embodiment

Figure 19:
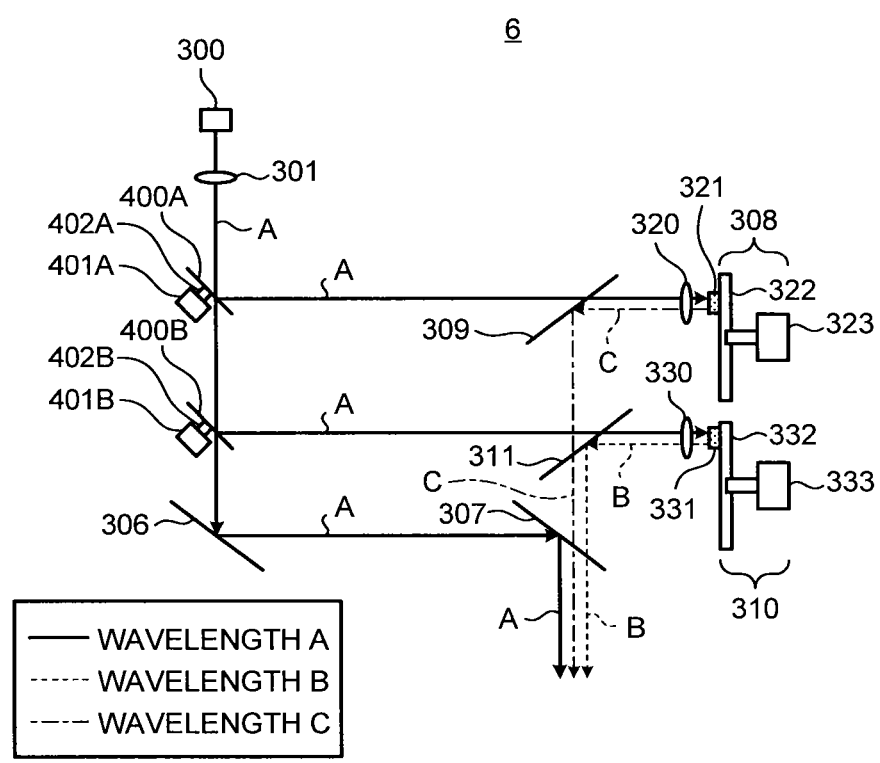
FIG. 19 is a schematic diagram illustrating an example of configuration of an illumination apparatus according to a sixth embodiment.

Next, a sixth embodiment will be explained. FIG. 19 illustrates an example of configuration of an illumination apparatus 6 according to this sixth embodiment. In FIG. 19, the same components those of FIG. 17 explained above are denoted with the same reference numerals, and detailed description thereabout is omitted. In this sixth embodiment, only one light source 300 is used to obtain light beams of RGB colors.

This sixth embodiment corresponds to the third embodiment explained above, but substrates on which fluorescent materials are formed include fluorescent material wheel units 308 and 310 made of a reflection member; and the polarization conversion switch 302, the polarization beam splitter 303, the polarization conversion switch 304 and the polarization beam splitter 305 of the illumination apparatus 2 according to the third embodiment illustrated in FIG. 10 are replaced with reflection/transmission wheels 400A and 400B.

It should be noted that the configuration of the reflection/transmission wheels 400A and 400B is the same as the reflection/transmission wheel 400 explained above. More specifically, the reflection/transmission wheel 400A is rotated by a drive unit 401A about a rotation axis 402A. Likewise, the reflection/transmission wheel 400B is rotated by a drive unit 401B about a rotation axis 402B.

Optical paths of the illumination apparatus 6 will be explained. First, a case where the reflection region 411 of the reflection/transmission wheel 400A exists in an optical path of light ray of a wavelength A, which is, for example, blue color, emitted from the light source 300 will be explained. In this case, the light ray is reflected by the reflection/transmission wheel 400A at a predetermined angle, and passes through the dichroic mirror 309 configured to reflect light of a wavelength C, which is, for example, green color, and transmit light rays of other wavelengths. Then, the light ray is incident upon the fluorescent material wheel unit 308. In the fluorescent material wheel unit 308, the light of the wavelength C is emitted by being excited by the light ray of the wavelength A. This light ray of the wavelength C is emitted from the fluorescent material wheel unit 308, and is reflected by the dichroic mirror 309. Then, the light ray of the wavelength C passes through the dichroic mirror 311 configured to reflect the light of the wavelength B and transmit light rays of other wavelengths, and further, passes through a dichroic mirror 307 configured to reflect the light of the wavelength A and transmit light rays of other wavelengths. Then, the light ray of the wavelength C is emitted from the illumination apparatus 6.

Secondly, a case where a transmission region 410 of the reflection/transmission wheel 400A as well as the reflection region 411 of the reflection/transmission wheel 400B exist in the optical path of the light ray of the wavelength A emitted from the light source 300 will be explained. In this case, the light ray passes through the reflection/transmission wheel 400A, and is emitted onto the reflection/transmission wheel 400B. Then, the light ray is reflected by the reflection/transmission wheel 400B at a predetermined angle. The light ray of the wavelength A reflected by the reflection/transmission wheel 400B is incident upon the fluorescent material wheel unit 310 via the dichroic mirror 311 configured to reflect the light of the wavelength B and transmit light rays of other wavelengths. In the fluorescent material wheel unit 310, the light of the wavelength B, which is, for example, red color, is emitted by being excited by the light ray of the wavelength A. This light ray of the wavelength B is emitted from the fluorescent material wheel unit 310, and is reflected by the dichroic mirror 311. Then, the light ray of the wavelength B passes through the dichroic mirror 307, and is emitted from the illumination apparatus 6.

Thirdly, a case where the transmission region 410 of the reflection/transmission wheel 400A as well as the transmission region 410 of the reflection/transmission wheel 400B exist in the optical path of the light ray of the wavelength A emitted from the light source 300 will be explained. In this case, the light ray passes the reflection/transmission wheels 400A and 400B, and is emitted on the mirror 306. Then, the light ray is reflected by the mirror 306 at a predetermined angle. Further, the light ray is reflected by the dichroic mirror 307 at a predetermined angle, and the light ray is emitted from the illumination apparatus 6.

As described above, the reflection/transmission wheel 400A switches between a state in which the light ray is guided to the fluorescent material 321 and a state in which the light ray is not guided to the fluorescent material 321. On the other hand, the reflection/transmission wheel 400B switches between a state in which the light ray is guided to the fluorescent material 331 and a state in which the light ray is not guided to the fluorescent material 331.

Figure 20:
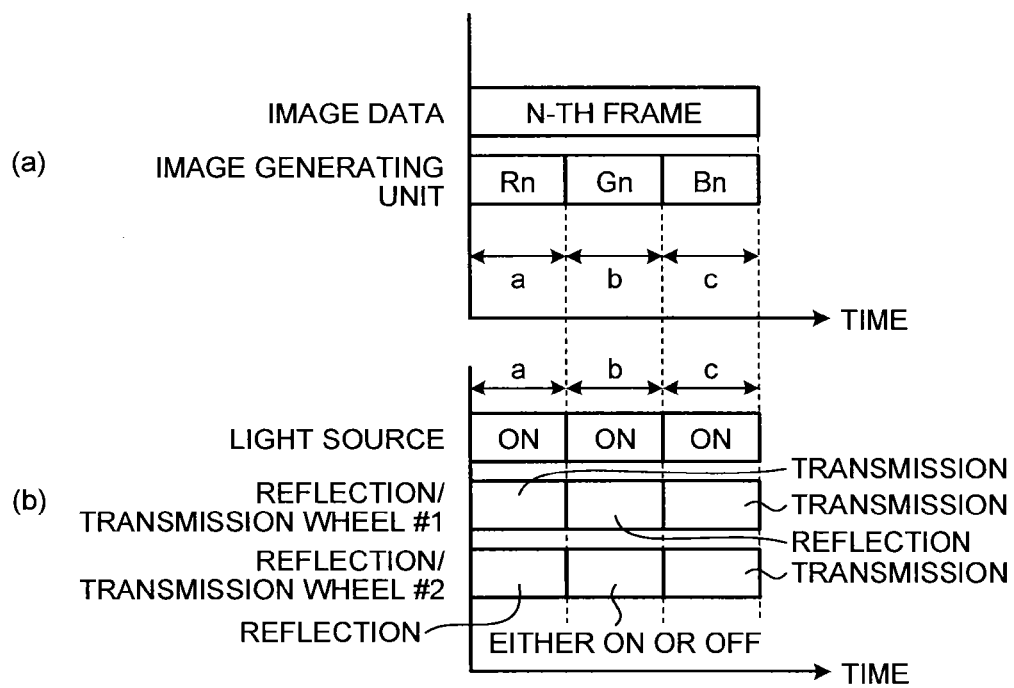
FIG. 20 is a schematic diagram illustrating an example of relationship between an image frame and control for obtaining emitted lights of RGB colors, according to the illumination apparatus according to the sixth embodiment.

FIG. 20 illustrates an example of relationship between an image frame and control for obtaining emitted lights of RGB colors in the illumination apparatus 6 according to the sixth embodiment. As illustrated in the part (a) of FIG. 20, in the n-th frame of the image data, the light beams of RGB colors, i.e., Rn, Gn, and Bn, are generated, and these light beams Rn, Gn, and Bn are emitted onto the image generating unit 144.

In FIG. 20, for the sake convenience, the light source 300 is simply denoted as a light source, and the reflection/transmission wheels 400A and 400 are denoted as a reflection/transmission wheel #1 and a reflection/transmission wheel #2, respectively. When the transmission region 410 of the reflection/transmission wheel #1 or #2 exists in the optical path of the light ray emitted from the light source 300, this is denoted as "transmission". When the reflection region 411 of the reflection/transmission wheel #1 or #2 exists in the optical path of the light ray emitted from the light source 300, this is denoted as "reflection".

As illustrated in the part (b) of FIG. 20, the light source is turned on (ON) in all of generation periods a, b, and c of the light beams Rn, Gn, and Bn. On the other hand, in a period a in which the light beam Rn is generated, the reflection/transmission wheels #1 and #2 are controlled such that the reflection/transmission wheels #1 and #2 are made into transmission and reflection, respectively. In a period b in which the light beam Gn is generated, the reflection/transmission wheel #1 is controlled so that the reflection/transmission wheel #1 is made into reflection, and the reflection/transmission wheel #2 may be set in any state. Further, in a period c in which the light beam Bn is generated, both of the reflection/transmission wheels #1 and #2 are controlled so that both of the reflection/transmission wheels #1 and #2 are made into transmission.

By performing the control as described above, the light beams of RGB colors, i.e., Rn, Gn, and Bn, are generated within one frame, and are emitted onto the image generating unit 144. Therefore, full color can be projected, and in addition, white color can be projected. In addition, the color can be changed by adjusting emission periods a, b, and c of RGB colors, respectively. For example, when the ratio of the period a is increased within one frame period, the level of red color can be increased in a projection image. For example, when the emission periods a, b, and c of RGB colors are appropriately adjusted, the color temperature can also be changed.

Like the illumination apparatus 4 according to the fourth embodiment, the illumination apparatus 6 according to this sixth embodiment can be incorporated into the projection apparatus 20, and the control thereof is the same. Therefore, detailed description thereabout is omitted here.

As described above, according to this sixth embodiment, the substrates 322 and 332 used in the fluorescent material wheel units 308 and 310 are made of the reflection member. Therefore, some of the optical path can be shared by, for example, the light ray emitted onto the fluorescent material 321 and the light ray emitted from the fluorescent material 321, and the space of the illumination apparatus 6 can be effectively used, which enables reducing the size of the illumination apparatus 6. In addition, the RGB colors are obtained using only one light source 300, and therefore, the size of the illumination apparatus 6 can be further reduced, and the cost and the power consumption can also be reduced.

Modification of Sixth Embodiment

Next, a modification of the sixth embodiment will be explained. Like the modification of the second embodiment explained above, this modification of the sixth embodiment is based on the sixth embodiment, and is further configured such that a first fluorescent material and a second fluorescent material respectively emitting lights of different wavelengths using light of one wavelength are formed on one substrate.

A substrate on which the first fluorescent material and the second fluorescent material are formed, which can be applied to this modification of the sixth embodiment, is equivalent to the substrate 500 explained in the modification of the third embodiment explained above, and detailed description thereabout is omitted.

Figure 21:
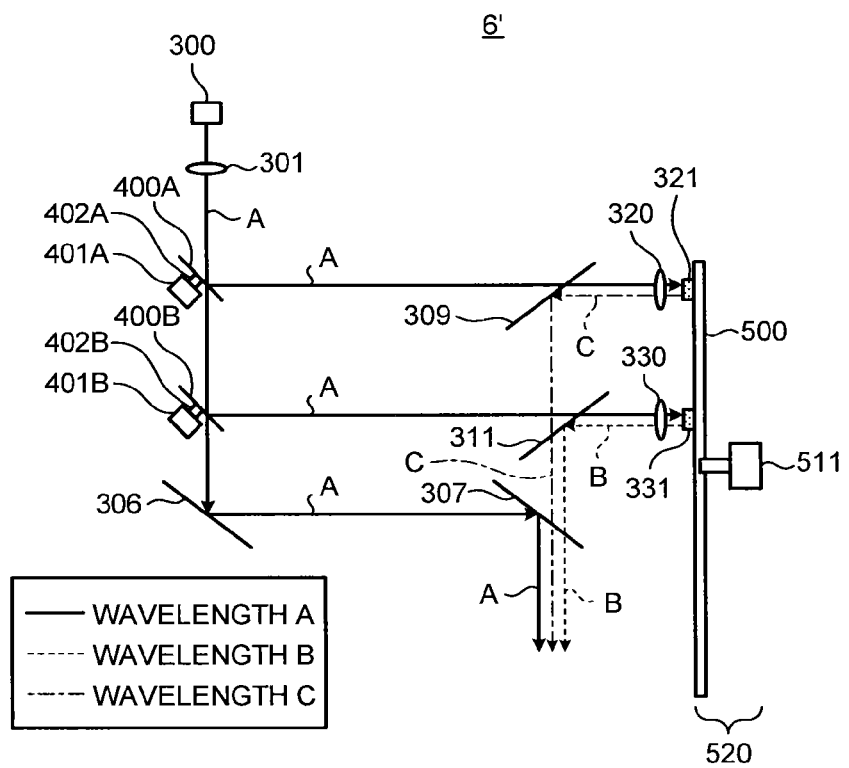
FIG. 21 is a schematic diagram illustrating an example of configuration of an illumination apparatus according to a modification of the sixth embodiment.

FIG. 21 illustrates an example of configuration of an illumination apparatus 6' according to this modification of the sixth embodiment. In FIG. 21, the same components as those of FIG. 19 explained above are denoted with the same reference numerals, and detailed description thereabout is omitted. The fluorescent material wheel unit 520 is equivalent to the fluorescent material wheel unit 520 explained in the modification of the third embodiment explained above, and detailed description thereabout is omitted.

With the configuration as described above, the light of the wavelength A reflected by the reflection/transmission wheel 400A is emitted onto the fluorescent material 321 formed on the substrate 500 via the dichroic mirror 309 and the condensing device 320. In the fluorescent material 321, the light of the wavelength C is emitted by being excited by the light ray of the wavelength A. This light of the wavelength C is reflected by the substrate 500 and is incident upon and reflected by the dichroic mirror 309 via the condensing device 220, and further the reflected light passes through the dichroic mirrors 311 and 307 and is emitted from the illumination apparatus 6'.

Likewise, the light of the wavelength A reflected by the reflection/transmission wheel 400B is emitted onto the fluorescent material 331 formed on the substrate 500 via the dichroic mirror 311 and the condensing device 330. In the fluorescent material 331, the light of the wavelength B is emitted by being excited by the light ray of the wavelength A. This light of the wavelength B is reflected by the substrate 500 and is incident upon and reflected by the dichroic mirror 311 via the condensing device 330, and is further emitted from the illumination apparatus 6' via the dichroic mirror 307.

Like the illumination apparatus 4 according to the fourth embodiment, the illumination apparatus 6' according to this modification of the sixth embodiment can be incorporated into the projection apparatus 20, and the control thereof is the same. Therefore, detailed description thereabout is omitted here. The control for obtaining emitted lights of RGB colors is the same as the case of the sixth embodiment explained using FIG. 20. Therefore, description thereabout is omitted here.

According to this modification of the sixth embodiment, it is sufficient to have only one substrate on which the fluorescent materials are formed and only one drive unit for driving the substrate. Therefore, as compared with the sixth embodiment explained above, the cost and the power consumption can be further reduced.

Seventh Embodiment

Figure 22:
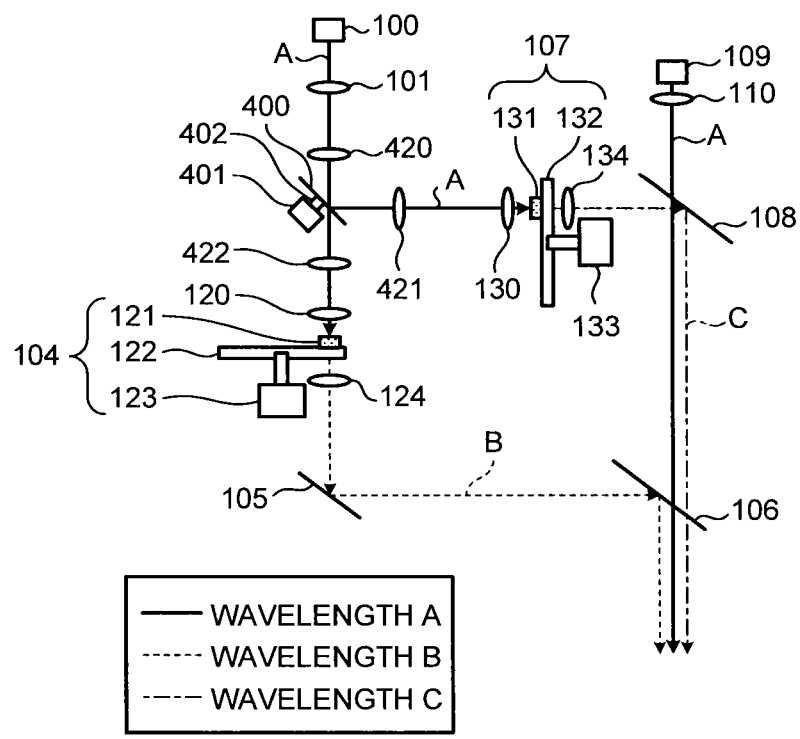
FIG. 22 is a schematic diagram illustrating an example of configuration of an illumination apparatus according to a seventh embodiment.

Next, a seventh embodiment will be explained. FIG. 22 illustrates an example of configuration of an illumination apparatus 7 according to this seventh embodiment. In FIG. 22, the same components as those of FIG. 1 explained above are denoted with the same reference numerals, and detailed description thereabout is omitted. This seventh embodiment is an example where a condensing device 420 and coupling lenses 421 and 422 are respectively provided for an incident optical path and an emitted optical path of a reflection/transmission wheel 400.

The illumination apparatus 7 has no difference from the first embodiment explained above except that the optical path of the light ray emitted from each of light sources 100 and 109 passes through the condensing device 420 at the incident side of the reflection/transmission wheel 400 and passes through the coupling lens 421 or 422 at the emitting side of the reflection/transmission wheel 400, and therefore, detailed description thereabout is omitted. Moreover, the control of the reflection/transmission wheel 400 is also the same as the first embodiment, and description thereabout is omitted.

Figure 23:
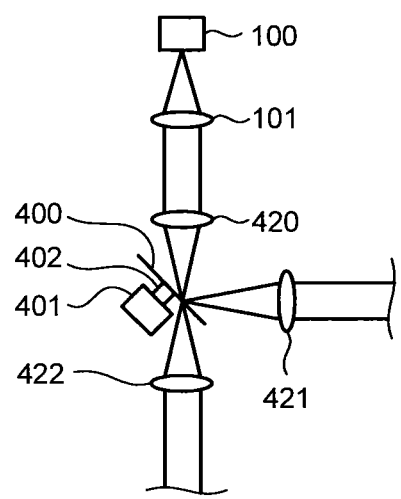
FIG. 23 is a schematic diagram illustrating, in more details, an example of configuration around a reflection/transmission wheel according to the seventh embodiment.

The seventh embodiment will be explained in more details with reference to FIG. 23. FIG. 23 illustrates, in more details, an example of configuration around the reflection/transmission wheel 400 according to this seventh embodiment. It should be noted that FIG. 23 illustrates portions of the illumination apparatus 7 which are closely related to this seventh embodiment, and the other portions are omitted.

The light ray emitted from the light source 100 is made into a parallel light beam by the coupling lens 101, and is condensed by the condensing device 420. The reflection/transmission wheel 400 is arranged at a focal point of this light ray. The light ray reflected by or transmitting through the reflection/transmission wheel 400 arranged at the focal point is made into parallel light beam by the coupling lens 421 or 422, and is incident upon a fluorescent material wheel unit 107 or 104.

Figure 24:
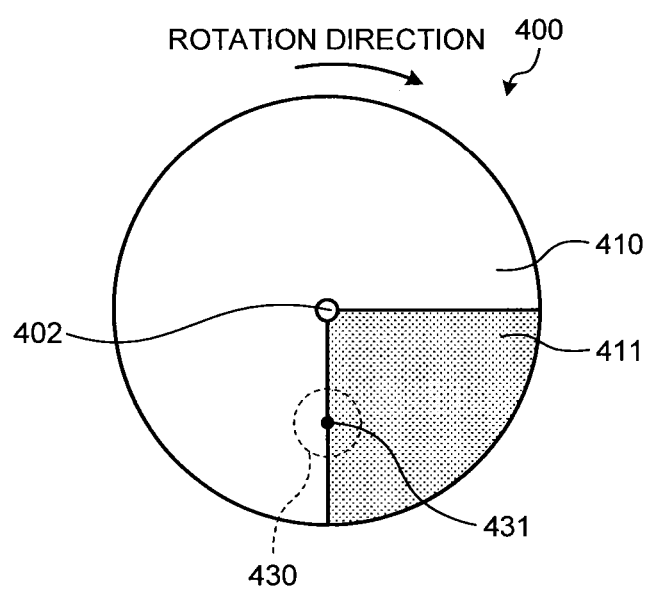
FIG. 24 is a schematic diagram illustrating how light ray is emitted onto the reflection/transmission wheel.

FIG. 24 illustrates how the light ray is emitted onto the reflection/transmission wheel 400. When the condensing device 420 is not used, the light ray is emitted onto the reflection/transmission wheel 400 with a certain degree of extension as illustrated as a spot 430. On the other hand, when the condensing device 420 is used, and the reflection/transmission wheel 400 is arranged at the focal point, the light ray is emitted onto the reflection/transmission wheel 400 with a smaller spot diameter, as illustrated as a spot 431, than the spot 430. Therefore, the light ray can pass a border portion between a reflection region 411 and a transmission region 410 in a shorter time. In other words, a switching time between R color and G color can be reduced, and this improves the color purity of the projection light.

In this case, the configuration according to this seventh embodiment in which the condensing device 420 and the coupling lenses 421 and 422 are arranged for the reflection/transmission wheel 400 is applied to the illumination apparatus 4 according to the fourth embodiment. However, this is not limited to this example. That is, this seventh embodiment can also be applied to the illumination apparatus 5 according to the fifth embodiment explained above and the illumination apparatus 6 according to the sixth embodiment explained above in the same manner.

Like the illumination apparatus 4 according to the fourth embodiment, the illumination apparatus 7 according to this seventh embodiment can be incorporated into the projection apparatus 20, and the control thereof is the same. Therefore, detailed description thereabout is omitted here.

Eighth Embodiment

Next, an eighth embodiment will be explained. The illumination apparatuses 1 to 7 according to the first to seventh embodiments, even when multiple light sources are provided, a light ray of a certain wavelength is emitted by the multiple light sources. In contrast, in this eighth embodiment, two light sources emit light rays of wavelengths which are different from each other.

Figure 25:
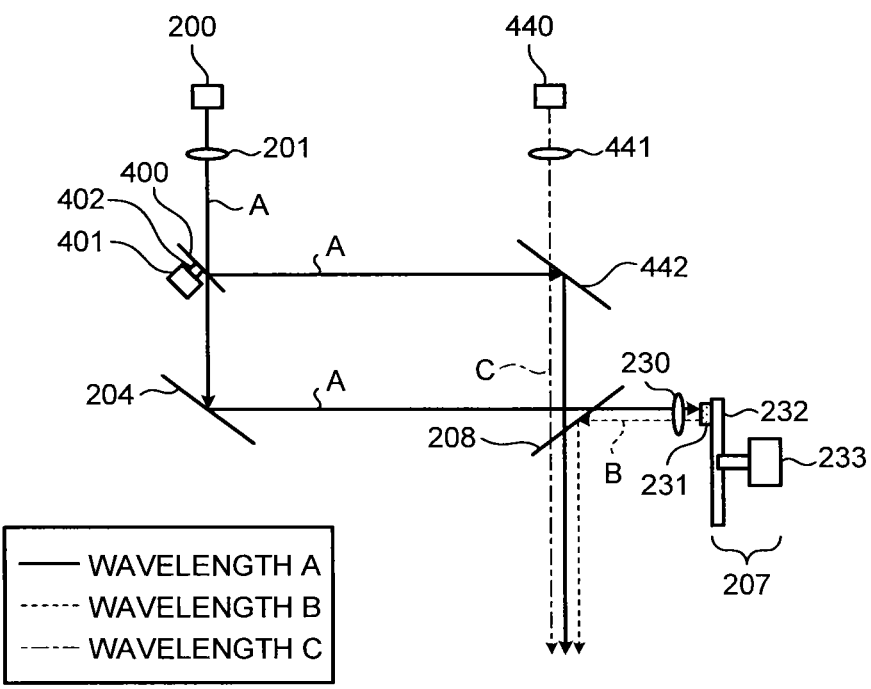
FIG. 25 is a schematic diagram illustrating an example of configuration of an illumination apparatus according to an eighth embodiment.

FIG. 25 illustrates an example of configuration of an illumination apparatus 8 according to this eighth embodiment. In FIG. 25, the same components as those of FIG. 17 explained above are denoted with the same reference numerals, and detailed description thereabout is omitted. The illumination apparatus 8 includes light sources 200 and 440, coupling lenses 201 and 441, a mirror 204, dichroic mirrors 208 and 442, a reflection/transmission wheel 400, and a fluorescent material wheel unit 207.

The light source 200 emits a light ray of a wavelength A, which is, for example, blue color. On the other hand, the light source 440 emits a wavelength different from the wavelength A, i.e., a light ray of a wavelength C, which is, for example, red color. The dichroic mirror 442 reflects the light of the wavelength A and transmits light rays of other wavelengths. The dichroic mirror 208 reflects the light of the wavelength B, which is, for example, red color, and transmits light rays of other wavelengths.

First, the optical path of the light ray of the wavelength A emitted from the light source 200 will be explained. When the reflection region 411 of the reflection/transmission wheel 400 exists in the optical path of the light ray, the light ray is incident upon the reflection/transmission wheel 400 via the coupling lens 201, and is reflected at a predetermined angle. The light ray of the wavelength A reflected by and emitted from the reflection/transmission wheel 400 is reflected by the dichroic mirror 442 at a predetermined angle, and further passes through the dichroic mirror 208. Then, the light ray of the wavelength A is emitted from the illumination apparatus 8.

When the transmission region 410 of the reflection/transmission wheel 400 exists in the optical path of the light ray of the wavelength A emitted from the light source 200, the light ray is incident upon the reflection/transmission wheel 400 via the coupling lens 201, passes through the reflection/transmission wheel 400, and is incident upon the mirror 204. The light ray is reflected by the mirror 204 at a predetermined angle, passes through the dichroic mirror 208, and is incident upon the fluorescent material wheel unit 207.

The light ray of the wavelength A incident upon the fluorescent material wheel unit 207 is emitted on the fluorescent material 231 via the condensing device 230. The fluorescent material 231 is excited by the light of the wavelength A, and emits light of a wavelength B which is a longer wavelength than the wavelength A. This light of the wavelength B is reflected by the substrate 232, and is emitted on the dichroic mirror 208 via the condensing device 230. Then, the light of the wavelength B is reflected at a predetermined angle, and is emitted from the illumination apparatus 8.

The light ray of the wavelength C emitted from the light source 440 is incident upon the dichroic mirror 442 via the coupling lens 441. The light ray passes through the dichroic mirror 442, further passes through the dichroic mirror 208, and is emitted from the illumination apparatus 8.

In this eighth embodiment, too, the reflection/transmission wheel 400 switches between a state in which the light ray is guided to the fluorescent material 231 and a state in which the light ray is not guided to the fluorescent material 231.

Figure 26:
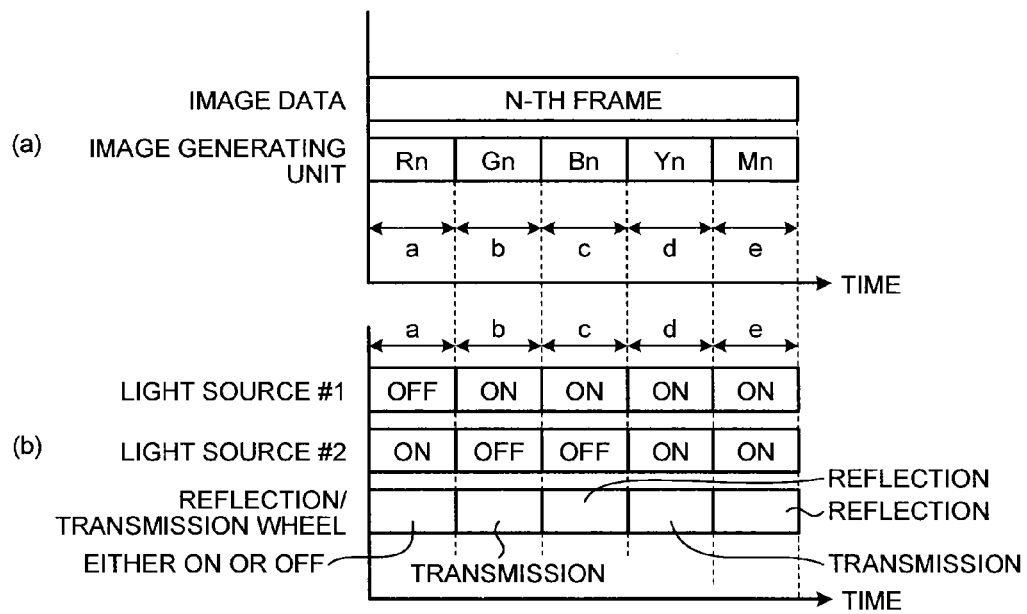
FIG. 26 is a schematic diagram illustrating an example of relationship between an image frame and control for obtaining emitted lights of respective colors, using the illumination apparatus according to the eighth embodiment.

FIG. 26 illustrates an example of relationship between an image frame and control for obtaining emitted lights of respective colors, using the illumination apparatus 8 according to the eighth embodiment. In this illumination apparatus 8, the light source 440 emits the light ray of the color (in this example, R color) which is different from the color of the light source 200, and therefore, the R color and the B color can be emitted at the same time, and the R color and the G color can be emitted at the same time.

As illustrated in the part (a) of FIG. 26, in the n-th frame of the image data, the light beams of RGB colors, i.e., Rn, Gn, and Bn, are generated, and the light beam Yn of yellow made by emitting the R color and the G color at the same time and the light beam Mn of magenta made by emitting the R color and the B color at the same time are generated, and these light beams Rn, Gn, and Bn and the light beams Yn and Mn are emitted onto the image generating unit 144.

As illustrated in the part (b) of FIG. 26, in a period a in which the light beam Rn is generated, the control unit 150 turns off the light source #1 (light source 200) (OFF), and turns on the light source #2 (light source 440) (ON). Since the light source #1 is OFF, the state of the reflection/transmission wheel 400 may be in any state. More specifically, any one of the transmission region 410 and the reflection region 411 may exist in the optical path of the light ray of the wavelength A from the light source #1.

In a period b in which the light beam Gn is generated, the control unit 150 turns on the light source #1 (ON), and turns off the light source #2 (OFF). At the same time, the drive unit 401 is driven and controlled so that the transmission region 410 of the reflection/transmission wheel 400 exists in the optical path of the light ray of the wavelength A from the light source #1. In a period c in which the light beam Bn is generated, the control unit 150 turns on the light source #1 (ON), and turns off the light source #2 (OFF). At the same time, the drive unit 401 is driven and controlled so that the reflection region 411 of the reflection/transmission wheel 400 exists in the optical path of the light ray of the wavelength A from the light source #1.

Further, in a period d in which the light beam Yn is generated, both of the light source #1 and the light source #2 are turned on (ON). At the same time, the drive unit 401 is driven and controlled so that the transmission region 410 of the reflection/transmission wheel 400 exists in the optical path of the light ray of the wavelength A from the light source #1.

Accordingly, the light ray of the wavelength C from the light source #2 passes through the dichroic mirrors 442 and 208, and is emitted from the illumination apparatus 8. At the same time, the light ray of the wavelength A provided by the light source #1 passes through the reflection/transmission wheel 400, and is reflected by the mirror 204 at a predetermined angle. Then, the reflected light ray is incident upon the fluorescent material wheel unit 207. The light of the wavelength B is excited and emitted by the fluorescent material 231 with the light ray incident thereupon, and the light of the wavelength B is reflected by the dichroic mirror 208. Then, the light of the wavelength B is emitted from the illumination apparatus 8. The illumination apparatus 8 emits the light ray of the wavelength B (red color) and the light ray of the wavelength C (green color) at the same time, so that the light beam Yn of yellow can be obtained.

Still further, in a period e in which the light beam Mn is generated, both of the light source #1 and the light source #2 are turned on (ON). At the same time, the drive unit 401 is driven and controlled so that the reflection region 411 of the reflection/transmission wheel 400 exists in the optical path of the light ray of the wavelength A from the light source #1.

Accordingly, the light ray of the wavelength C provided by the light source #2 passes through the dichroic mirrors 442 and 208, and is emitted from the illumination apparatus 8. At the same time, the light ray of the wavelength A provided by the light source #1 is reflected by the reflection/transmission wheel 400 at a predetermined angle, and is further reflected by the dichroic mirror 442. Then, the light ray of the wavelength A emitted from the dichroic mirror 442 passes through the dichroic mirror 208, and is emitted from the illumination apparatus 8. The illumination apparatus 8 emits the light ray of the wavelength B (red color) and the light ray of the wavelength A (blue color) at the same time, so that the light beam Mn of magenta can be obtained.

In the above description, the reflection/transmission wheel 400 is used as a unit for switching the optical path in this eighth embodiment. However, this is not limited to this example. This eighth embodiment can also be applied even when the polarization conversion switch 102 and the polarization beam splitter 103 illustrated in the first embodiment and the like are used in combination. In this case, at least the light source 200 preferably emits light ray of linear polarization.

Like the illumination apparatus 4 according to the fourth embodiment, the illumination apparatus 8 according to this eighth embodiment can be incorporated into the projection apparatus 20, and the control thereof is the same. Therefore, detailed description thereabout is omitted here.

Ninth Embodiment

Next, a ninth embodiment will be explained. In the first to eighth embodiment explained above, for example, on the fluorescent material wheel unit 104, one type of the fluorescent material 121 emitting a light ray of one wavelength is formed on the substrate 121. In contrast, in this ninth embodiment, multiple types of fluorescent materials emitting lights of wavelengths different from each other are formed on a substrate.

Figure 27:
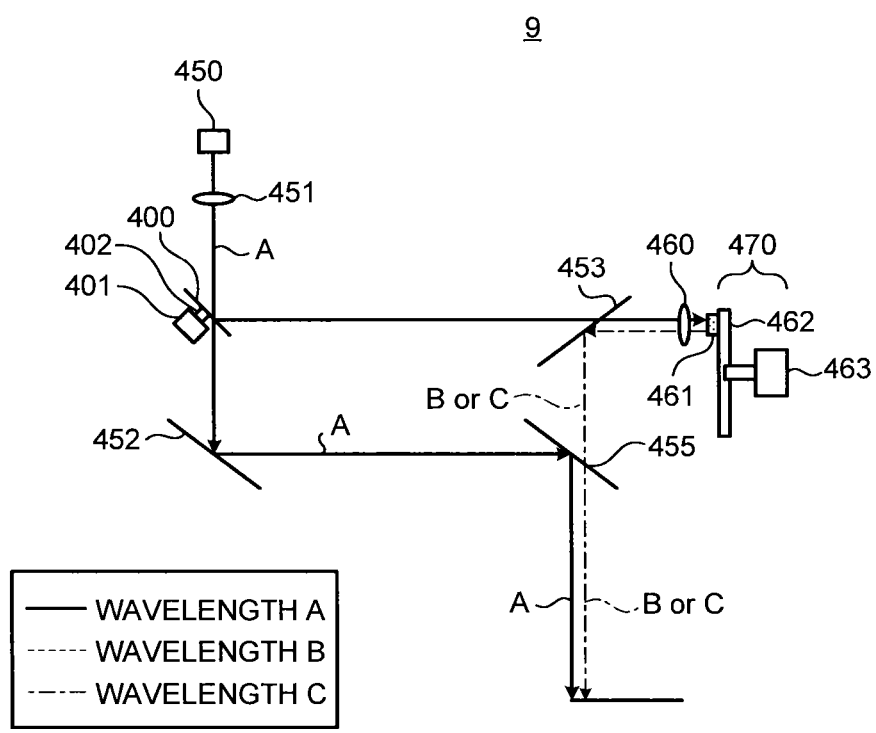
FIG. 27 is a schematic diagram illustrating an example of configuration of an illumination apparatus according to a ninth embodiment.

FIG. 27 illustrates an example of configuration of an illumination apparatus 9 according to this ninth embodiment. The illumination apparatus 9 includes a light source 450, a coupling lens 451, a reflection/transmission wheel 400, a mirror 452, dichroic mirrors 453 and 455, and a fluorescent material wheel unit 470. The light source 450 emits a light ray of a wavelength A, which is, for example, blue color. The coupling lens 451 emits the incident light ray as a parallel light beam. Like the above description, the reflection/transmission wheel 400 is rotated by the drive unit 401 about the rotation axis 402, and is arranged such that a transmission region 410 and a reflection region 411 are divided by its radius.

The dichroic mirror 453 reflects the light ray of the wavelength B and the light ray of the wavelength C and transmits light rays of other wavelengths. The dichroic mirror 455 reflects the light ray of the wavelength A, which is blue color, and transmits light rays of other wavelengths.

The fluorescent material wheel unit 470 includes a condensing device 460, a substrate 462, a fluorescent material 461 formed on the substrate, and a drive unit 463. The condensing device 460 condenses the incident light ray onto the fluorescent material 461. In this example, the substrate 462 is made of a reflection material. According to the control of the control unit 150, the drive unit 463 rotates and drives the substrate 462.

Figure 28:
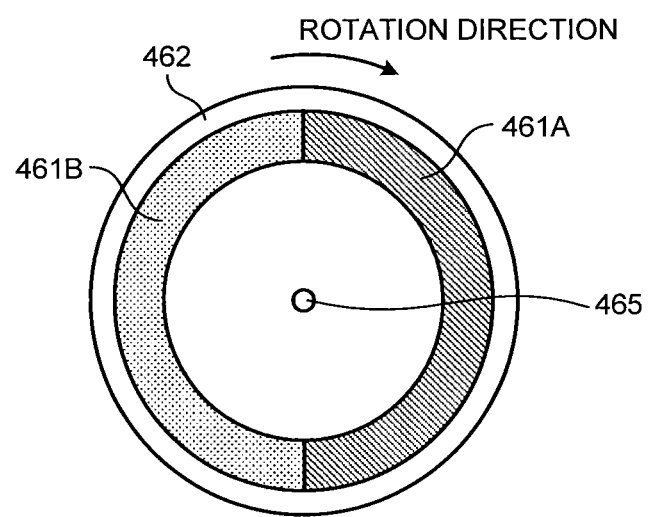
FIG. 28 is a schematic diagram illustrating a substrate of a fluorescent material wheel unit according to the ninth embodiment when it is seen from a surface on which a fluorescent material is formed.

FIG. 28 illustrates the substrate 462 of the fluorescent material wheel unit 470 according to this ninth embodiment when it is seen from a surface on which the fluorescent material 461 is formed. As illustrated in FIG. 28, in this ninth embodiment, the fluorescent material 461 formed on the substrate 462 includes a first fluorescent material 461A and a second fluorescent material 461B. In this case, the first fluorescent material 461A is excited by the light of the wavelength A, which is, for example, blue color, and emits a longer wavelength than the wavelength A, i.e., a light of a wavelength B, which is, for example, red color. On the other hand, likewise, the second fluorescent material 461B is excited by the light of the wavelength A, and emits a longer wavelength than the wavelength A, i.e., a light of a wavelength C, which is, for example, green color.

In FIG. 28, each of the first fluorescent material 461A and the second fluorescent material 461B is formed in a range of angle of 180 degrees about a rotation center 465, but this is not limited to this example. More specifically the first fluorescent material 461A and the second fluorescent material 461B are formed in other ranges of angles as long as the first fluorescent material 461A and the second fluorescent material 461B do not overlap each other.

The drive unit 463 includes, for example, a stepping motor, which rotates and drives the substrate 462 about the rotation axis 465 on the basis of the range of angle of each of the first fluorescent material 461A and the second fluorescent material 461B.

Optical paths of the illumination apparatus will be explained with reference to FIG. 27. First, a case where the transmission region 410 of the reflection/transmission wheel 400 exits in the optical path of the light ray of the wavelength A from the light source 450 will be explained. In this case, the light ray of the wavelength A emitted from the light source 450 is made by the coupling lens 451 into parallel light beam, and passes through the reflection/transmission wheel 400. Then, the light beam is incident upon the mirror 452. The light ray is reflected by the mirror 452 at a predetermined angle, and is reflected by the dichroic mirror 455 at a predetermined angle. Then, the light ray is emitted from the illumination apparatus 9.

Secondly, a case where the reflection region 411 of the reflection/transmission wheel 400 exits in the optical path of the light ray of the wavelength A from the light source 450 will be explained. In this case, the light ray of the wavelength A emitted from the light source 450 passes through the coupling lens 451, and is incident upon the reflection/transmission wheel 400. The light ray is reflected by the reflection/transmission wheel 400 at a predetermined angle, and passes through the dichroic mirror 453. Then, the light ray is incident upon the fluorescent material wheel unit 470.

In the fluorescent material wheel unit 470, the incident light ray of the wavelength A is condensed by the condensing device 460 onto the fluorescent material 461. In this case, when the substrate 462 is rotated and controlled so that the first fluorescent material 461A exists at the focal point, the first fluorescent material 461A is excited with the light ray of the wavelength A, and emits the light of the wavelength B. On the other hand, when the substrate 462 is rotated and controlled so that the second fluorescent material 461B exists at the focal point, the second fluorescent material 461B is excited with the light ray of the wavelength A, and emits the light of the wavelength C.

The light ray of the wavelength B or the wavelength C emitted by the first fluorescent material 461A or the second fluorescent material 461B is emitted onto the dichroic mirror 453 via the condensing device 460. The light ray of the wavelength B or the wavelength C is emitted by the dichroic mirror 453 at a predetermined angle, and passes through the dichroic mirror 455. Then, the light ray of the wavelength B or the wavelength C is emitted from the illumination apparatus 9.

In this ninth embodiment, the reflection/transmission wheel 400 also switches between a state in which the light ray is guided to any one of the first fluorescent material 461A and the second fluorescent material 461B and a state in which the light ray is guided to none of the first fluorescent material 461A and the second fluorescent material 461B.

Figure 29:
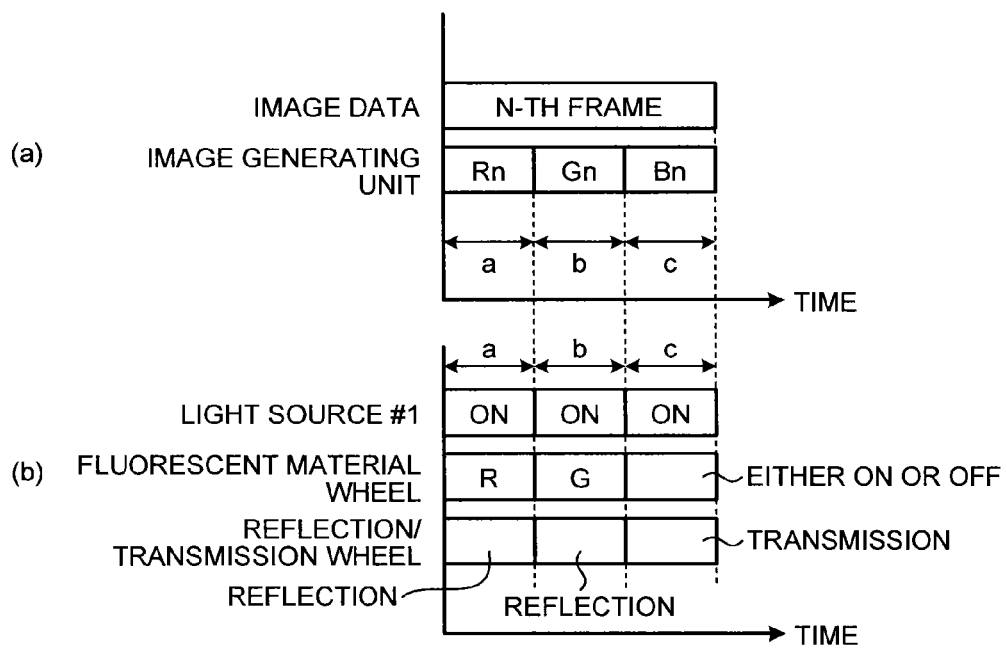
FIG. 29 is a schematic diagram illustrating an example of relationship between an image frame and control for obtaining emitted lights of RGB colors, according to the ninth embodiment.

FIG. 29 illustrates an example of relationship between an image frame and control for obtaining emitted lights of RGB colors, according to this ninth embodiment. As illustrated in the part (a) of FIG. 29, in the n-th frame of the image data, the light beams of RGB colors, i.e., Rn, Gn, and Bn, are generated, and these light beams Rn, Gn, and Bn are emitted onto the image generating unit 144.

As illustrated in the part (b) of FIG. 29, in each of periods a, b, and c in which light beams Rn, Gn, and Bn are generated, the light source #1 (light source 450) is turned on at all times (ON). In the period a in which the light beam Rn is generated, the fluorescent material wheel unit 470 is rotated and controlled so that the first fluorescent material 461A exists at the focal point of the light ray. At the same time, the reflection/transmission wheel 400 is controlled so that the reflection region 411 exists in the optical path of the light ray from the light source 450. In the period b in which the light beam Gn is generated, the fluorescent material wheel unit 470 is rotated and controlled so that the second fluorescent material 461B exists at the focal point of the light ray. At the same time, the reflection/transmission wheel 400 is controlled so that the reflection region 411 exists in the optical path of the light ray from the light source 450. In the period c in which the light beam Bn is generated, the reflection/transmission wheel 400 is controlled so that the transmission region 410 exists in the optical path of the light ray from the light source 450. At this occasion, the light ray from the light source 450 is not incident upon the fluorescent material wheel unit 470, and therefore, in the fluorescent material wheel unit 470, any one of the first fluorescent material 461A and the second fluorescent material 461B may be at the focal point.

By performing the control as described above, the light beams of RGB colors, i.e., Rn, Gn, and Bn, are generated within one frame, and are emitted onto the image generating unit 144. Therefore, full color can be projected, and in addition, white color can be projected. In addition, the color can be changed by adjusting emission periods a, b, and c of RGB colors, respectively. For example, when the ratio of the period a is increased within one frame period, the level of red color can be increased in a projection image. For example, when the emission periods a, b, and c of RGB colors are appropriately adjusted, the color temperature can also be changed.

In the above description, the reflection/transmission wheel 400 is used as a unit for switching the optical path in this ninth embodiment. However, the embodiment is not limited to this example. This ninth embodiment can also be applied even when the polarization conversion switch 102 and the polarization beam splitter 103 illustrated in the first embodiment and the like are used in combination. In this case, the light source 450 preferably emits light ray of linear polarization.

Like the illumination apparatus 4 according to the fourth embodiment, the illumination apparatus 9 according to this ninth embodiment can be incorporated into the projection apparatus 20, and the control thereof is the same. Therefore, detailed description thereabout is omitted here.

As described above, in the fluorescent material wheel unit, multiple types of fluorescent materials each emitting a light ray of one wavelength which is different from each other are formed on the substrate, and therefore, lights of multiple colors can be emitted by one fluorescent material wheel unit using a light ray from one light source. Therefore, it is possible to achieve the following advantages. The number of components in the illumination apparatus can be reduced, the size of the illumination apparatus can be reduced, and the cost of the apparatus can be reduced.

According to the present invention, there is an advantage in that light of each color can be obtained using less number of light sources than a case where light of each color is obtained by exciting the fluorescent material.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. An illumination apparatus for emitting light onto an optical modulation device that forms an image according to a modulation signal and illuminates an object, the illumination apparatus comprising:
    a light source;
    a fluorescent material that emits light of a color different from a color of light emitted by the light source; and
    a light guiding unit that switches between a state in which the light emitted from the light source is guided to the fluorescent material and a state in which the light emitted from the light source is not guided to the fluorescent material,
    wherein the light guiding unit includes:
        a polarization switch unit that switches a polarization direction of light between a first polarization direction and a second polarization direction; and
        a light control unit that transmits or reflects the light emitted from the polarization switch unit in such a manner that the light control unit transmits light having the first polarization direction and reflects light having the second polarization direction.

2. The illumination apparatus according to claim 1, wherein the fluorescent material is formed on a substrate which is a reflection member.

3. The illumination apparatus according to claim 2, further comprising a light condensing unit that condenses light onto the member.

4. An illumination apparatus for emitting light onto an optical modulation device that forms an image according to a modulation signal and illuminates an object, the illumination apparatus comprising:
    a light source;
    a fluorescent material that emits light of a color different from a color of light emitted by the light source;
    a light guiding unit that switches between a state in which the light emitted from the light source is guided to the fluorescent material and a state in which the light emitted from the light source is not guided to the fluorescent material; and
    a drive unit that moves the fluorescent material so that excited light is emitted continuously during a period in which the light is guided to the fluorescent material by the light guiding unit and a position to be emitted returns back with a predetermined cycle.

5. The illumination apparatus according to claim 4, wherein the light guiding unit includes:
    a member including a transmission region that transmits light and a reflection region that reflects light; and
    a member drive unit that drives the member so as to put the member into one of states including a state in which the transmission region transmits the light emitted from the light source and a state in which the reflection region reflects the light.

6. An illumination apparatus for emitting light onto an optical modulation device that forms an image according to a modulation signal and illuminates an object, the illumination apparatus comprising:
    a light source;
    a fluorescent material that emits light of a color different from a color of light emitted by the light source; and
    a light guiding unit that switches between a state in which the light emitted from the light source is guided to the fluorescent material and a state in which the light emitted from the light source is not guided to the fluorescent material,
    wherein the light guiding unit includes:
        a member including a transmission region that transmits light and a reflection region that reflects light; and
        a member drive unit that drives the member so as to put the member into one of states including a state in which the transmission region transmits the light emitted from the light source and a state in which the reflection region reflects the light, and
    wherein the fluorescent material is arranged on an optical path of light passed through the transmission region or on an optical path of light reflected by the reflection region,
    wherein the fluorescent material has, on a single substrate, a first region that emits light of a first color which is different from the color of the light emitted from the light source and a second region that emits light of a second color which is different from the first color, and
    wherein the light guiding unit further includes a substrate drive unit that moves the substrate so that the light emitted from the light source is guided to any one of the first region and the second region.

7. A projection apparatus that projects an image based on image data, the projection apparatus comprising:
    a first light source;
    a fluorescent material that emits light of a color different from a color of light emitted by the first light source;
    a light guiding unit that switches between a first state in which the light emitted from the first light source is guided to the fluorescent material and a second state in which the light emitted from the first light source is not guided to the fluorescent material;
    an optical modulation device onto which the light emitted from the light guiding unit is emitted, and which forms an image according to a modulation signal using the light;
    a projection optical system that projects the image formed by the optical modulation device onto a display medium; and
    a control unit configured to sequentially switch between the first state and the second state of the light guiding unit within one frame period of the image data,
    wherein the light guiding unit includes:
        a polarization switch unit that switches a polarization direction of light between a first polarization direction and a second polarization direction; and
        a light control unit that transmits or reflects the light emitted from the polarization switch unit in such a manner that the light control unit transmits light having the first polarization direction and reflects light having the second polarization direction.

8. The projection apparatus according to claim 7, further comprising a second light source that emits light of a color different from the color emitted by the fluorescent material,
 wherein the control unit provides, within one frame period of the image data, a period in which the first light source is turned on and the second light source is turned off and a period in which the first light source is turned off and the second light source is turned on.

9. A projection apparatus that projects an image based on image data, the projection apparatus comprising:
 a first light source;
 a fluorescent material that emits light of a color different from a color of light emitted by the first light source;
 a light guiding unit that switches between a first state in which the light emitted from the first light source is guided to the fluorescent material and a second state in which the light emitted from the first light source is not guided to the fluorescent material;
 an optical modulation device onto which the light emitted from the light guiding unit is emitted, and which forms an image according to a modulation signal using the light;
 a projection optical system that projects the image formed by the optical modulation device onto a display medium;
 a control unit configured to sequentially switch between the first state and the second state of the light guiding unit within one frame period of the image data; and
 a drive unit that moves the fluorescent material so that excited light is emitted continuously during a period in which the light is guided to the fluorescent material by the light guiding unit and a position to be emitted returns back with a predetermined cycle.

10. The projection apparatus according to claim 9, wherein the fluorescent material is formed on a substrate which is a reflection member.

11. The projection apparatus according to claim 10, further comprising a light condensing unit that condenses light onto the member.

12. A projection apparatus that projects an image based on image data, the projection apparatus comprising:
 a first light source;
 a fluorescent material that emits light of a color different from a color of light emitted by the first light source;
 a light guiding unit that switches between a first state in which the light emitted from the first light source is guided to the fluorescent material and a second state in which the light emitted from the first light source is not guided to the fluorescent material;
 an optical modulation device onto which the light emitted from the light guiding unit is emitted, and which forms an image according to a modulation signal using the light;
 a projection optical system that projects the image formed by the optical modulation device onto a display medium; and
 a control unit configured to sequentially switch between the first state and the second state of the light guiding unit within one frame period of the image data,
 wherein the light guiding unit includes:
  a member including a transmission region that transmits light and a reflection region that reflects light; and
  a member drive unit that drives the member so as to put the member into one of states including a state in which the transmission region transmits the light emitted from the light source and a state in which the reflection region reflects the light,
 wherein the fluorescent material is arranged on an optical path of light passed through the transmission region or on an optical path of light reflected by the reflection region,
 wherein the fluorescent material has, on a single substrate, a first region that emits light of a first color which is different from the color of the light emitted from the light source and a second region that emits light of a second color which is different from the first color, and
 wherein the light guiding unit further includes a substrate drive unit that moves the substrate so that the light emitted from the light source is guided to any one of the first region and the second region.

13. A projection apparatus that projects an image based on image data, the projection apparatus comprising:
 a first light source that emits light of a first color;
 a second light source that emits light of a second color;
 a fluorescent material that emits light of a third color by being excited by the light of the first color;
 a light guiding unit that switches between a first state in which the light emitted from the first light source is guided to the fluorescent material and a second state in which the light emitted from the first light source is not guided to the fluorescent material;
 an optical modulation device onto which the light emitted from the light guiding unit and the light emitted from the second light source are emitted, and which forms an image according to a modulation signal using each of the lights emitted; and
 a control unit configured to control the first light source, the second light source, and the light guiding unit so that, within one frame period of the image data, at least one of the light of the first color, the light of the second color, and the light of the third color is emitted onto the optical modulation device,
 wherein the light guiding unit includes:
  a member including a transmission region that transmits light and a reflection region that reflects light; and
  a member drive unit that drives the member so as to put the member into one of states including a state in which the transmission region transmits the light emitted from the light source and a state in which the reflection region reflects the light,
 wherein the fluorescent material is arranged on an optical path of light passed through the transmission region or on an optical path of light reflected by the reflection region, and
 wherein, within one frame period of the image data, the control unit controls the first light source, the second light source, and the light guiding unit in such a manner that:
  in a first period, the control unit turns on only the second light source, so that the light of the second color is emitted onto the optical modulation device;
  in a second period, the control unit turns on only the first light source, and controls the light guiding unit so that the light of the first color is guided to the fluorescent material, whereby the light of the third color is emitted onto the optical modulation device;
  in a third period, the control unit turns on only the first light source, and controls the light guiding unit so that the light of the first color is not guided to the fluorescent material, whereby the light of the first color is emitted onto the optical modulation device;
  in a fourth period, the control unit turns on the first light source and the second light source, and controls the light guiding unit so that the light of the first color is guided to the fluorescent material, whereby both of the light of the second color and the light of the third color are emitted onto the optical modulation device; and in a fifth period, the control unit turns on the first light source and the second light source, and controls the light guiding unit so that the light of the first color is not guided to the fluorescent material, whereby both of the light of the first color and the light of the second color are emitted onto the optical modulation device.

14. A projection apparatus that projects an image based on image data, the projection apparatus comprising:
- a first light source that emits light of a first color;
- a second light source that emits light of a second color;
- a fluorescent material that emits light of a third color by being excited by the light of the first color;
- a light guiding unit that switches between a first state in which the light emitted from the first light source is guided to the fluorescent material and a second state in which the light emitted from the first light source is not guided to the fluorescent material;
- an optical modulation device onto which the light emitted from the light guiding unit and the light emitted from the second light source are emitted, and which forms an image according to a modulation signal using each of the lights emitted; and
- a control unit configured to control the first light source, the second light source, and the light guiding unit so that, within one frame period of the image data, at least one of the light of the first color, the light of the second color, and the light of the third color is emitted onto the optical modulation device, wherein the light guiding unit includes:
- a polarization switch unit that switches a polarization direction of light between a first polarization direction and a second polarization direction; and
- a light control unit that transmits or reflects the light emitted from the polarization switch unit in such a manner that the light control unit transmits light having the first polarization direction and reflects light having the second polarization direction.

* * * * *